US012717615B2

(12) United States Patent
Halverson et al.

(10) Patent No.: US 12,717,615 B2
(45) Date of Patent: Aug. 25, 2026

(54) CLOUD-BASED ARCHITECTURE FOR PROCESSING DISTRIBUTED TRANSACTIONS

(71) Applicant: Microsoft Technology Licensing, LLC, Redmond, WA (US)

(72) Inventors: Alan Dale Halverson, Verona, WI (US); Ryan Daniel O'Connor, Kirkland, WA (US); Jose Aguilar Saborit, Bellevue, WA (US); Raghunath Ramakrishnan, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 441 days.

(21) Appl. No.: 18/338,295

(22) Filed: Jun. 20, 2023

(65) Prior Publication Data

US 2024/0394096 A1 Nov. 28, 2024

Related U.S. Application Data

(60) Provisional application No. 63/503,956, filed on May 23, 2023.

(51) Int. Cl.

*G06F 9/46* (2006.01)
*G06F 9/345* (2018.01)
*G06F 9/48* (2006.01)

(52) U.S. Cl.

CPC ............ *G06F 9/4881* (2013.01); *G06F 9/345* (2013.01)

(58) Field of Classification Search

CPC .................................................... G06F 9/4881
USPC ......................................................... 718/102
See application file for complete search history.

(56) References Cited

U.S. PATENT DOCUMENTS

| | | | | |
|---|---|---|---|---|
| 5,504,900 | A * | 4/1996 | Raz | G06F 9/4881 |
| 6,332,160 | B1 * | 12/2001 | Tabuchi | H04L 67/10 709/224 |
| 11,360,802 | B2 * | 6/2022 | Kumar | G06F 16/2308 |
| 11,436,212 | B2 * | 9/2022 | Luo | G06F 16/2379 |
| 11,599,520 | B1 * | 3/2023 | Vermeulen | G06F 9/466 |

(Continued)

OTHER PUBLICATIONS

International Search Report and Written Opinion received for PCT Application No. PCT/US2024/026734, Oct. 14, 2024, 15 pages.

(Continued)

*Primary Examiner* — Mehran Kamran
(74) *Attorney, Agent, or Firm* — Barta Jones, PLLC

(57) ABSTRACT

Systems and methods for processing a distributed transaction are provided. A distributed execution statement including a plurality of tasks for executing a query and a table to be modified by the executed query is received. A first task is transmitted to a first backend node and a second task is transmitted to a second backend node. A first confirmation that the first task is executed and a second confirmation that the second task is executed are received. Executing the first task includes making a first modification to the table and a first identification of the first modification, and executing the second task includes making a second modification to the table and a second identification of the second modification. Based at least on each of the first task and the second task being completed, committing the first modification and the second modification to the table.

20 Claims, 18 Drawing Sheets

(56) References Cited

U.S. PATENT DOCUMENTS

| | | | | |
|---|---|---|---|---|
| 11,874,822 | B1 * | 1/2024 | Singh | G06F 16/2315 |
| 12,001,420 | B2 * | 6/2024 | Palmer | G06F 16/2315 |
| 2007/0209038 | A1 * | 9/2007 | Fuchs | G06Q 30/06 719/313 |
| 2013/0117307 | A1 * | 5/2013 | Vishnoi | G06F 16/2343 707/E17.014 |
| 2015/0379062 | A1 * | 12/2015 | Vermeulen | G06F 16/2358 707/691 |
| 2017/0083588 | A1 * | 3/2017 | Lang | G06F 16/24526 |
| 2017/0220617 | A1 * | 8/2017 | Bortnikov | G06F 16/2329 |
| 2018/0329944 | A1 * | 11/2018 | Horii | G06F 16/2365 |
| 2019/0306274 | A1 * | 10/2019 | Lai | H04L 67/63 |
| 2019/0384643 | A1 * | 12/2019 | Gao | G06F 9/5022 |
| 2021/0165762 | A1 * | 6/2021 | Chan | G06F 16/2255 |
| 2022/0092050 | A1 * | 3/2022 | Luo | G06F 16/2322 |
| 2022/0391382 | A1 * | 12/2022 | Schreter | G06F 16/27 |
| 2023/0107071 | A1 * | 4/2023 | Lin | G06F 16/2379 707/615 |
| 2023/0385265 | A1 * | 11/2023 | Karamanolis | G06F 16/2471 |
| 2024/0013218 | A1 * | 1/2024 | Jiang | G06F 16/2343 |
| 2024/0070143 | A1 * | 2/2024 | Cruanes | G06F 9/524 |
| 2024/0378191 | A1 * | 11/2024 | Bhola | G06F 16/2322 |
| 2024/0394096 | A1 * | 11/2024 | Halverson | G06F 16/2365 |
| 2025/0103587 | A1 * | 3/2025 | Lee | G06F 16/1865 |

OTHER PUBLICATIONS

International Preliminary Report on Patentability (Chapter I) received for PCT Application No. PCT/US2024/026734, mailed on Dec. 4, 2025, 9 Pages.

* cited by examiner

CLOUD-BASED ARCHITECTURE FOR PROCESSING DISTRIBUTED TRANSACTIONS

CROSS-REFERENCE TO RELATED APPLICATION

This application claims the benefit of U.S. Provisional Application No. 63/503,956, filed May 23, 2023, the entirety of which is hereby incorporated by reference herein.

BACKGROUND

Distributed transactions are operations performed across two or more data repositories. A distributed transaction is typically executed by one or more nodes, with at least one node executing a part of the transaction for one data repository and at least one other node executing another part of the transaction for another data repository.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for a scalable, elastic, and reliable cloud-based architecture for query processing in distributed transactions are provided. The method includes receiving, by a distributed query processor (DQP) implemented on a processor, a distributed execution statement, the distributed execution statement including a plurality of tasks for executing a distributed transaction; assigning, by the DQP, a quantity of backend nodes for executing the plurality of tasks; requesting, by the DQP, a first backend node to execute a first task of the plurality of tasks; requesting, by the DQP, a second backend node to execute a second task from the plurality of tasks; receiving, by the DQP from the first backend node, a first confirmation that the first task has been executed, the execution of the first task providing a first result, the first confirmation indicating that the first result is ready to be committed by the DQP; receiving, by the DQP, from the second backend node, a second confirmation that the second task has been executed, the execution of the second task providing a second result, the second confirmation indicating that the second result is ready to be committed by the DQP; executing, by the DQP, a conflict check between the first result and the second result; and based on determining the first result does not conflict with the second result, committing, by the DQP, the distributed transaction.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale. Any of the drawings may be combined into a single embodiment or example.

DETAILED DESCRIPTION

Figure 1:
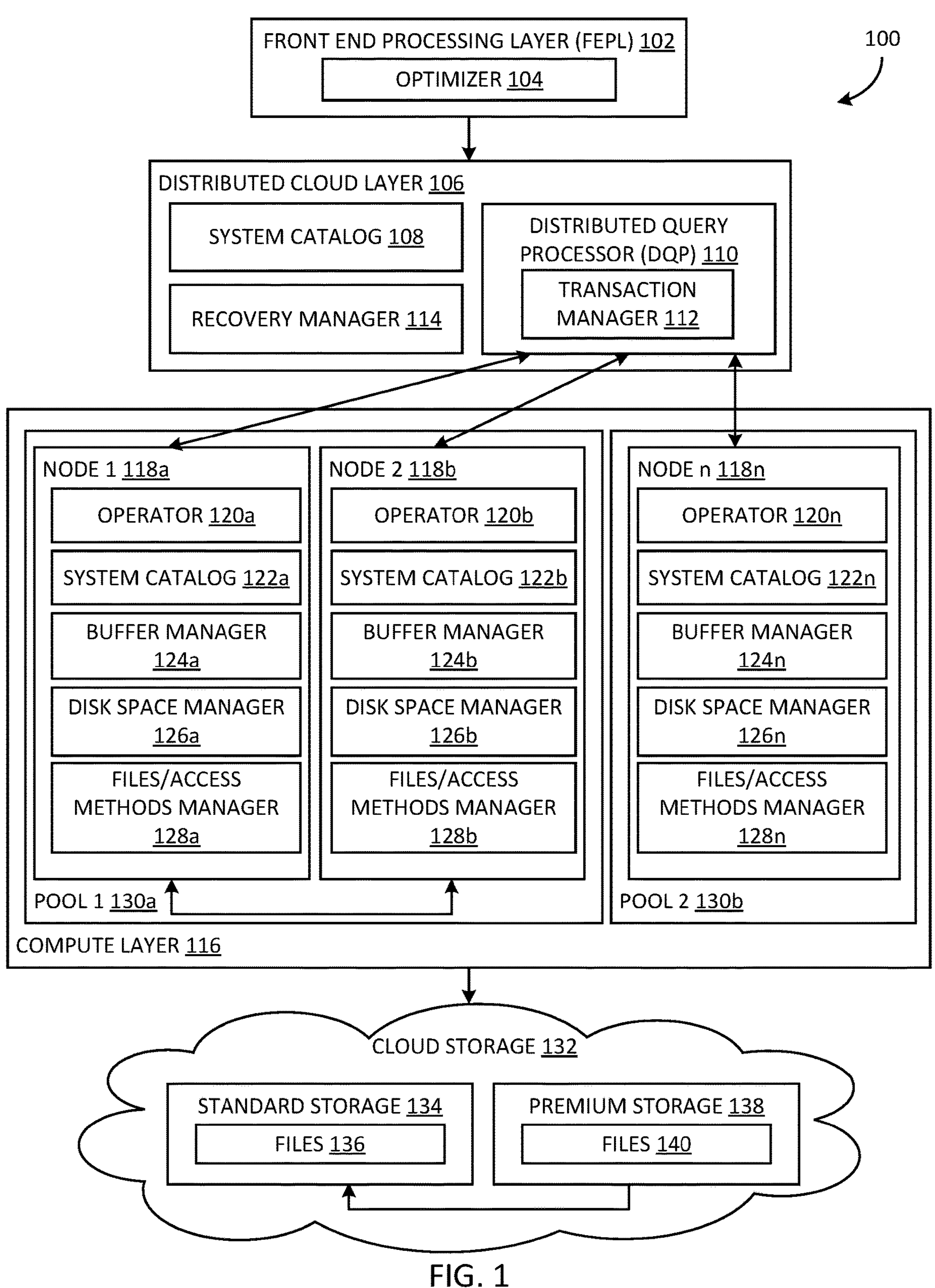
FIG. 1 is a block diagram illustrating an example cloud-based architecture system for query processing in distributed transactions.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, distributed transactions are performed across two or more data repositories. A distributed transaction is typically executed by one or more nodes, with at least one node executing a part of the transaction for one data repository and at least one other node executing another part of the transaction for another data repository. Distributed transactions that are performed across additional repositories are executed using additional nodes.

Conventional solutions implement one or more nodes that perform the transaction-related tasks. The nodes are implemented in two phases, such as a two phase commit (2PC) process. In a first phase, the node is asked to prepare for a commit and then vote on whether they are able to execute the commit, and in a second phase, where the node voted to execute, the node executes the commit. However, this presents durability-based concerns, as availability, computational resources, and so forth can change between the node sending the vote and receiving the instructions to execute the commit. In addition, the second phase proceeds only if each and every node returns a vote to commit. In other words, the votes to commit must be unanimous. This presents challenges with large transactions, as greater numbers of nodes are required to execute the transaction, leading to a greater likelihood that at least one node votes to not execute the commit.

Examples of the present disclosure present systems and methods of a cloud-based architecture that is implemented to process distributed transactions. The system includes an optimizer that generates a distributed execution statement that includes instructions for solving a distributed transaction, a distributed query processor, also referred to as a distributed cloud processor, a distributed plan executor, or a distributed plan orchestrator, that executes the steps to execute the distributed transaction, i.e., a query, and a compute layer, comprising a plurality of nodes organized in pools that perform the transactional tasks. The computing layer is stateless, and thus a state cannot be changed in the computing layer, and the distributed transaction is managed at the level of the optimizer, which provides centralized transaction management decisions. By enabling centralized transaction management, aspects of the present disclosure provide scalable and elastic solutions by managing the quantity of nodes used to perform the transactional steps on an as-needed basis, leading to computational and operational efficiency and minimized waste of resources.

Thus, the present disclosure provides a highly scalable, elastic, and reliable cloud-based architecture for processing distributed transactions. The cloud-based architecture addresses inherently technical problems posed by distributed transactions in large-scale data analytics. First, committing changes requires unanimous votes from each backend node to commit the changes, so if any backend node votes not to commit, the distributed transaction will be aborted. This is exacerbated with large-scale data analytics that implement a greater number of backend nodes to execute the transaction tasks. Second, if any of the backend nodes that initially voted to commit are no longer durable at the time the transaction tasks are to be executed or the changes are to be committed, the transaction will abort because the changes cannot be committed. Third, in the case of failure to commit changes, a change in state at the backend node is lost and difficult, or even impossible, to back-propagate and rebuild dependencies.

The cloud-based architecture provides a technical solution to these inherently technical problems by partitioning between the compute steps, storage steps, and optimization steps and implementing a graph-based execution model, such as a hypergraph across all queries. The nodes that perform the compute steps. i.e., the transaction tasks, are stateless, so that when an update is executed, i.e., intermediate results of queries are immediately written, the changes are made visible. Once the changes are committed, the dependency for a next node is satisfied to perform a next transaction task. Once all edges are satisfied, the task is completed and blocked. In the case of failure, the cloud-based architecture propagates back to rebuild the dependencies for a next task. The cloud-based architecture further supports multi-table transactions because the change is committed at a single layer by the distributed query processor. Further, because the changes are committed and controlled by the distributed query processor, rather than at the node level, nodes are task agnostic, i.e., genericized, and able to be added to a pool of nodes, perform a transaction task, and then either be released from the pool to perform a different transaction task for the same query or a different query. The nodes may perform the transaction tasks asynchronously, may be available asynchronously, and may not even be present for the outcome of the transaction because the nodes are stateless and genericized, and the changes are committed by the distributed query processor.

Thus, the present disclosure provides a technical solution to the technical problem of performing distributed transactions in large-scale data analytics. In the same manner, the present disclosure provides numerous technical effects including, but not limited to, increasing processing speed due to the presumption of committing changes and committing changes immediately in the absence of a conflict, improved elasticity and scalability due to i) the separation between where the data is stored and where the data is processed, and ii) the genericization and stateless nature of the nodes that are able to perform various transaction tasks asynchronously in the execution of a distributed transaction, and provides improved user interactions by providing only the nodes required for processing so that a user is charged only for the work being performed, rather than theoretical capacity that may or may not be used or needed.

FIG. 1 is a block diagram illustrating a system 100 that includes a cloud-based architecture for processing distributed transactions. The system 100 illustrated in FIG. 1 is provided for illustration only. Other examples of the system 100 can be used without departing from the scope of the present disclosure.

The system 100 is a cloud-based architecture that includes a front end processing layer (FEPL) 102, a distributed cloud layer 106, a compute layer 116, and cloud storage 132. The FEPL 102 includes an optimizer 104 that receives a query, such as an SQL query, optimizes the received query, and produces a distributed execution statement as an artifact. To optimize the received query, the optimizer 104 determines the transaction tasks to be performed in order to process the distributed transaction in the received statement and estimates the computational resources needed to execute the determined transaction tasks. In some examples, the received query may be a DML (insert/update/delete) statement that includes instructions to insert data into one or more tables, update data included in one or more tables, and/or delete data included in one or more tables. The distributed executed statement is a writable manifest file that contains the physical metadata changes required by the received query and instructions that include specific transaction tasks to perform the changes and a quantity of nodes needed to perform the specific transaction tasks. In some examples, the file is updated in real-time as the statements in the transaction are successfully completed.

The system 100, and in particular the interrelationships between the FEPL 102, the distributed cloud layer 106, the compute layer 116, and the cloud storage 132, is based on design principles that enable the system 100, and in particular the compute layer 116, to be scaled to any size that is needed to execute a particular distributed transaction. Because the compute layer 116 is stateless, the state cannot be changed. If the compute layer 116 fails to receive information that is needed as part of the execution task definition, the transaction task will fail and not be executed. If a state change is unable to be communicated through new files in storage, the state will be unable to exist. In one example, the compute layer 116 performs no initial contact with the distributed cloud layer 106, and more particularly the DQP 110. In other words, communication between the compute layer 116 and the DQP 110 occurs only in response to initial contact performed by the DQP 110. These design principles result in centralized management at the DQP 110 level, rather than the compute layer 116 level, enabling improved scalability.

As referenced herein, physical metadata is metadata that stores the physical location of data files in a database and the associated file metadata. The physical metadata provide the list of visible data files to process for managed scan. In examples where the physical metadata for a table physically maps to a set of blob files, the physical metadata is referred to as a manifest file. Each database (not shown) includes an internal table to track manifest files for all tables under the database. In some examples, a single manifest file per table per DML transaction is stored in a .json format and may include extended fields. This records the add files and remove data files operations within a transaction. In some examples, the physical metadata is also the source reference for cleanup and storage optimization discovery processes. In contrast, logical metadata, as referenced herein, is database logical metadata such as SQL DB logical metadata, that is not versioned and used to leverage a SQL database's effort to implement versioned metadata.

As referenced herein, manifest file records include one or more of an add, remove, and metadata. An add is a path to the file being added, either relative or absolute. Add properties include, but are not limited to, size, minimum/maximum stats, cell assignments, partition info, delete bitmap, and so forth. A remove path is a path to a file being removed, which occurs after an add in a current or previous manifest and does not occur multiple times in a same manifest file for the same parquet file. The add and remove records enable a new record to be added that replaces an existing record that is removed. The metadata refers to logical metadata information that may evolve over time via column mappings.

The system 100, and in particular the interrelationships between the FEPL 102, the distributed cloud layer 106, the compute layer 116, and the cloud storage 132, further enables concurrency control for executing the transaction tasks. In some examples, the system 100 implements optimistic concurrency control for data and physical metadata and pessimistic concurrency control for logical metadata, such as table definitions and column types. As referenced herein, in optimistic concurrency control, resources are locked and released over a shorter period of time at the conclusion of a transaction, whereas in pessimistic concurrency control resources are locked early in the transaction and released upon the transaction closing. Optimistic concurrency control and pessimistic concurrency control are utilized because data files are immutable once written, so that new versions of the same data go to new files, and because logical metadata and clone information are stored in row tables in SQL MDF and may not be versioned.

The distributed cloud layer 106 includes a system catalog 108, a distributed query processor (DQP) 110, and a recovery manager 114. As illustrated in FIG. 1, the components of the distributed cloud layer 106 are provided on a separate layer than the FEPL 102. However, it should be understood that various examples are possible. In some examples, one or more components of the distributed cloud layer 106 are provided as components of the FEPL 102.

The system catalog 108 catalogs data from one or more databases in the cloud storage 132 and/or nodes 118*a*-118*n* in the compute layer 116. For example, the FEPL 102 pulls information from the system catalog 108 to present stored information as in a single database, but for more efficient processing the information may be stored on or in separate databases.

As referenced herein, the DQP 110 may be referred to as distributed cloud processor, a distributed plan executor, or a distributed plan orchestrator. The DQP 110 executes the steps, or transaction tasks, to solve, or execute, the distributed execution statement. For example, the DQP 110 determines the quantity of nodes 118*a*-118*n* that are added to a pool, such as a first pool 130*a* or a second pool 130*b*, of nodes 118*a*-118*n* that are to perform the transaction tasks. The DQP 110 includes a transaction manager 112 that manages the nodes 118*a*-118*n*. For example, the transaction manager 112 determines which transaction tasks to assign to which nodes 118*a*-118*n*, taking into account dependencies, the number of nodes 118*a*-118*n* available, and so forth.

The DQP 110 further controls the locking of resources and changes. In some examples, the DQP 110 utilizes snapshot isolation, persists SQL database transaction IDs across restarts for garbage collection (GC) correctness, enforces SI semantics for a physical metadata table or tables, and enforces a database specific locking model with table-level locks and below locks, as described in greater detail below.

In some examples, the DQP 110 generates a topology map that maps the nodes 118*a*-118*n* used to process each transaction task of a particular distributed transaction. The topology map may be used so that, in the case of failure, the recovery manager 114 is able to propagate back to a completed version and re-assign transaction tasks to nodes 118*a*-118*n* in order to ensure the transaction tasks are completed. In some examples, the topology map is a hypergraph, where the nodes represent the tasks and maps the dependencies of one transaction task to another and one node 118*a*-118*n* to another.

The recovery manager 114 manages recovery of the system 100 in the event of a system crash. In some examples, the recovery manager 114 manages recovery of the FEPL 102, the distributed cloud layer 106, and the cloud storage 132. In other examples, the recovery manager 114 manages recovery of the distributed cloud layer 106 and the FEPL 102. In still other examples, the recovery manager 114 manages recovery of only the distributed cloud layer 106. In some examples, the recovery manager 114 restarts an entire instance of execution transaction tasks as part of recovering the system 100. In other examples, the recovery manager 114 restarts only an instance of the FEPL 102, the distributed cloud layer 106, or both. To recover to the correct operational state of the FEPL 102, the distributed cloud layer 106, or both, the recovery manager 114 executes a database recovery protocol that recovers metadata and small amounts of transactional state data, as the actual data is stored in a database, such as the cloud storage 132, and is not lost during a system crash. More particularly, the recovery manager 114 recovers logical metadata and a sequence of the physical metadata files in order to begin reading and writing the one or more tables. It should be understood that because the nodes 118-118*n* do not store or include state data, recovery is not performed for the nodes 118-118*n*. In order to begin the execution of the transaction tasks for a particular distributed transaction following recovery, the transaction manager 112 selects the same or different nodes from the nodes 118-118*n* to execute the transaction tasks. In some examples, the recovery manager 114 identifies the transaction tasks to be executed following the recovery based on the generated topology map, and the transaction manager 112 selects the nodes 118*a*-118*n* to execute the transaction tasks.

As illustrated in FIG. 1, the transaction manager 112 is implemented as a component of the DQP 110, while the recovery manager 114 is implemented separately from the DQP 110. However, it should be understood that FIG. 1 is presented as an exemplary example of the system 100 and should not be construed as limiting. In various examples, one or both of the transaction manager 112 and the recovery manager 114 are implemented as components of the DQP 110, or one or both of the transaction manager 112 and the recovery manager 114 are implemented as separate components on the distributed cloud layer 106 than the DQP 110.

The compute layer 116 includes one or more of the nodes 118*a*-118*n*, also referred to herein as backend nodes, worker nodes, backend worker nodes, or virtual machines (VMs), organized into one or more pools 130*a*-130*b*. The quantity of the nodes 118*a*-118*n* included in the system 100 is dynamic and may include more or fewer than the first node 118*a*, second node 118*b*, and third node 118*n* illustrated in FIG. 1. In implementation, the number of nodes 118*a*-118*n* used to perform transaction tasks for a particular distributed transaction may be 10, 100, 500, 1,000, 10,000, and so forth.

As referenced herein, the nodes 118a-118n are task agnostic, i.e., genericized, in that any node 118a-118n is operable to perform any transaction task in a particular distributed transaction. In one example, any of the nodes 118a-118n is able to be integrated into any particular topology of the compute layer 116 by scrubbing previous data from the nodes 118a-118n, as the nodes 118a-118n are stateless when initially integrated into the topology.

Each of the nodes 118a-118n includes similar and in some examples, identical components and is operable to perform the same functionality as other ones of the nodes 118a-118n. For example, the first node 118a includes an operator 120a, a system catalog 122a, a buffer manager 124a, a disk space manager 126a, and a files/access methods manager 128a. In some examples, the operator 120a performs transaction tasks as assigned by the transaction manager 112. In some examples, the system catalog 122a manages an aspect of the cloud storage 132 that is stored locally on the node 118a, such as a table or a file to be modified by the transaction task. In some examples, the buffer manager 124a allocates memory in the cloud storage 132 or the system catalog 122a so that the changes performed by the operator 120a are able to be stored. In some examples, the disk space manager 126a manages allocation and deallocation of pages within the system catalog 122a. In some examples, the files/access methods manager 128a manages access to the files that are modified by the operator 120a. For example, the files/access methods manager 128a requests and receives access to any files needed for modification in the course of executing a particular transaction task.

As shown in the system 100 in FIG. 1, the nodes 118a-118n are arranged in the pools 130a-130b. For example, the compute layer 116 illustrated in FIG. 1 includes a first pool 130a and a second pool 130b. The first pool 130a includes the first node 118a and the second node 118b, while the second pool 130b includes the third node 118n. It should be understood the arrangement of the nodes 118a-118n within the pools 130a-130b are provided for illustration only and should not be construed as limiting. More or fewer of the nodes 118a-118n may be provided in the first pool 130a, more or fewer of the nodes 118a-118n may be provided in the second pool 130b, and more or fewer than two pools 130a-130b may be provided in the compute layer 116 according to various examples.

In some examples, the nodes 118a-118n are arranged in pools 130a-130b in order to optimize a cache, or caches, used for the data to be modified by the transaction tasks performed by the nodes 118a-118n. For example, many tasks, queries, transactions, and so forth touch the same pieces of data over time. The transaction manager 112 arranges, when possible, the tasks, queries, transactions, and so forth to a same pool 130a-130b so that the data is retrieved from a cache for each instance. In other words, the first and second nodes 118a and 118b in the first pool retrieve data from a first cache to execute the assigned transaction tasks and the third node 118n in the second pool retrieves data from a second cache to execute the assigned transaction tasks. This increases the number of hits on the cache, as opposed to the nodes 118a-118n pulling data from the cloud storage 132. By implementing any number of the pools 130a-130b, the system 100 enables virtually unlimited concurrency of transaction tasks that may be performed asynchronously to execute a distributed transaction.

The pools 130a-130b further facilitate a tiered storage hierarchy model included within the system 100. In some examples, the tiered storage hierarchy model is a mechanism by which memory is allocated and managed within the system 100 by centralizing concurrency of transaction tasks among the respective pools 130a-130b. As noted herein, this brings related workloads, such as transaction tasks that will touch the same or similar data, to the pool 130a-130b so that the workloads utilize the same cache to execute the transaction tasks. Although in some examples, the workloads between different nodes in a pool 130a-130b or the workloads between pools 130a-130b may interfere with one another, transaction tasks and/or pools 130a-130b may be refined to coordinate workloads and minimize or eliminate interference. For example, when the first node 118a executes a transaction task, the data to compute is retrieved and stored in the system catalog 122a as computable data, i.e., in a writable format as opposed to a read-only format. By implementing the nodes 118a-118n in pools 130a-130b that call to the same cache, the system 100 reduces computational resources used by calling and storing the data repeatedly. In addition, the tiered storage model enables the transaction manager 112 to scale pools up and down as needed based on a workload, including one or both of adding or removing pools 130a-130b and adding or removing nodes 118a-118b from pools 130a-130b, because data is not permanently and locally stored on any one node 118a-118n, but rather on a partitioned cloud storage 132 that is accessed by the nodes 118a-118n to perform the transaction tasks.

The cloud storage 132 is remote storage that includes standard storage 134 and premium storage 138. The standard storage 134 includes files 136, such as columnar files. In some examples, the data in the files 136 is organized into cells, which enable scaling as tens, hundreds, or thousands of cells may be stored remotely in a durable state in the cloud storage 132. The premium storage 138 enables efficient upserts and, through a tuple mover, converts files 140 into files 136 in the standard storage 134. In some examples, premium storage 138 is a specialized type of storage within the cloud storage 132 that is designed for executing intensive workloads. In some examples, the premium storage 138 may store data on a premium drive in order to host input/output (I/O) sensitive workloads.

Figure 2:
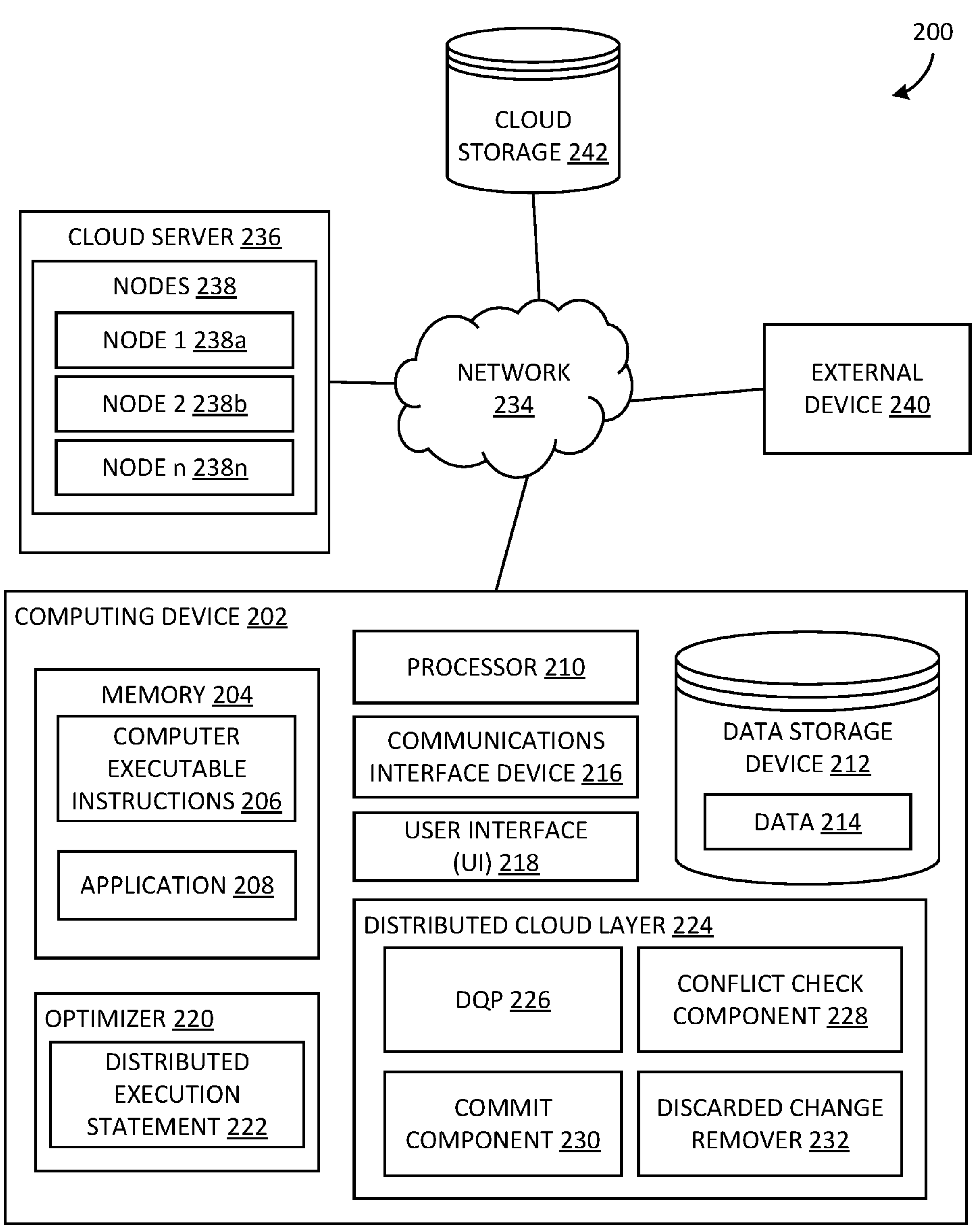
FIG. 2 is a block diagram illustrating an example system for query processing in distributed transactions.

FIG. 2 is a block diagram illustrating an example system 200 for processing a distributed transaction. The system 200 illustrated in FIG. 2 is provided for illustration only. Other examples of the system 200 can be used without departing from the scope of the present disclosure. In some examples, the system 200 includes one or more aspects of the system 100 illustrated in FIG. 1.

The system 200 includes a computing device 202, a cloud server 236, and an external device 240. Each of the computing device 202, the cloud server 236, and the external device 240) are communicatively coupled to and communicate via a network 234. The computing device 202 represents any device executing computer-executable instructions 206 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The computing device 202 can also include less-portable devices such as servers, desktop personal computers, kiosks, IoT devices, or tabletop devices. Additionally, the computing device 202 can represent a group of processing units or other computing devices. In some examples, the computing device 202 is a device executed in the cloud.

In some examples, the computing device 202 includes a memory 204 that includes the computer-executable instructions 206, a processor 210, and a user interface (UI) 218. The processor 210 includes any quantity of processing units, including but not limited to CPU(s), GPU(s), and NPU(s). The processor 210 is programmed to execute the computer-executable instructions 206. The computer-executable instructions 206 may be performed by the processor 210, performed by multiple processors 210 within the computing device 202, or performed by a processor external to the computing device 202. In some examples, the processor 210 is programmed to execute computer-executable instructions 206 such as those illustrated in the figures described herein. In various examples, the processor 210 is configured to execute one or more of an optimizer 220 and a DQP 226 as described herein. In other words, the optimizer 220) and the DQP 226, and their respective sub-components described in greater detail below, are implemented on and/or by the processor 210.

The memory 204 includes any quantity of media associated with or accessible by the computing device 202. The memory 204 in these examples is internal to the computing device 202, as illustrated in FIG. 2. In other examples, the memory 204 is external to the computing device 202 or includes memory components both internal and external to the computing device 202. The memory 204 stores data, such as the computer-executable instructions 206 and one or more applications 208. The applications 208, when executed by the processor 210, operate to perform various functions on the computing device 202. The application 208 can communicate with counterpart applications or services, such as web services accessible via the network 234. In an example, the applications 208 represent downloaded client-side applications that correspond to server-side services executing in a cloud, such as the cloud server 236.

The user interface 218 includes a graphics card for displaying data to a user and receiving data from the user. The user interface 218 can also include computer-executable instructions, for example a driver, for operating the graphics card. Further, the user interface 218 can include a display, for example a touch screen display or natural user interface, and/or computer-executable instructions, for example a driver, for operating the display. In some examples, the touch screen display of the user interface 218 enables the user to select a network protocol to utilize for executing cross-device communication, as described in greater detail below. The user interface 218 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 202 in one or more ways.

The computing device 202 further includes a communications interface device 216. The communications interface device 216 includes a network interface card and/or computer-executable instructions, such as a driver, for operating the network interface card. Communication between the computing device 202 and other devices, such as but not limited to the cloud server 236, can occur using any protocol or mechanism over any wired or wireless connection. In some examples, the communications interface device 216 is operable with short range communication technologies such as by using near-field communication (NFC) tags.

The computing device 202 further includes a data storage device 212 for storing data, such as, but not limited to data 214. The data storage device 212 in some non-limiting examples includes a redundant array of independent disks (RAID) array. In some examples, the data storage device 212 is an example of the system catalog 108 illustrated in FIG. 1. The data storage device 212, in this example, is included within the computing device 202, attached to the computing device 202, plugged into the computing device 202, or otherwise associated with the computing device 202. In other examples, the data storage device 212 includes a remote data storage accessed by the computing device 202 via the network 244, such as a remote data storage device, a data storage in a remote data center, or a cloud storage.

In some examples, the external device 240 is a device, or devices, external to the computing device 202. For example, as described herein, the external device 240 may be a mobile electronic device, a laptop, a tablet, a wearable device, an augmented reality (AR) or virtual reality (VR) device, or any other suitable device. In some examples, the external device 240) is a remote storage location, such as the cloud storage 132 illustrated in FIG. 1.

The computing device 202 further includes an optimizer 220. In some examples, the optimizer 220 is an example of the optimizer 104 illustrated in FIG. 1. The optimizer 220 receives a query, such as an SQL query, optimizes the received query, and produces a distributed execution statement 222 as an artifact. In some examples, the received query may be a DML (insert/update/delete) statement that includes instructions to insert data into one or more tables, update data included in one or more tables, and/or delete data included in one or more tables. The distributed executed statement 222 is a writable manifest file that contains the physical metadata changes required by the received query and instructions that include specific transaction tasks to perform the changes and a quantity of nodes needed to perform the specific transaction tasks. In some examples, the distributed executed statement 222 is updated in real-time as the statements in the transaction are successfully completed.

The computing device 202 further includes a distributed cloud layer 224. In some examples, the distributed cloud layer 224 is an example of the distributed cloud layer 106 illustrated in FIG. 1. The distributed cloud layer 224 includes a DQP 226, a conflict check component 228, a commit component 230, and a discarded change remover 232. The DQP 226 may be an example of the DQP 110 illustrated in FIG. 1. The DQP 226 executes the steps, or transaction tasks, to solve, or execute, the distributed execution statement 222. For example, the DQP 226 arranges, when possible, the tasks, queries, transactions, and so forth to one or more nodes 118*a*-118*n*, or a pool 130*a*-130*b* that includes the one or more nodes 118*a*-118*b*, that perform the transaction tasks of the distributed execution statement 222.

The conflict check component 228 executes a write/write conflict detection process upon transaction tasks being returned, from the one or more nodes 118*a*-118*n*, as completed. In some examples, the write/write conflict detection process executes a file level detection, as any current state of a table will have files in storage representing data that may be read as well as information regarding deletes. When a delete is processed, any existing file may include a delete. An entry is made in the manifest file record. At the time at which the changes are committed by the commit component, the physical metadata is read that includes which files were updated with delete information. The names of these files are written in a temporary, front end database stored in the data storage device 212, as any concurrent transaction task(s)

performed on different nodes **118*a*-118*n* theoretically may conflict. The front end database is stored in temporary storage because this information is used at commit time only, and thus is not maintained long term. Various examples of a conflict between transaction tasks include inserting a same row, overwriting a same row; and so forth. The conflict check component 228 determines whether a conflict is present. In examples where a conflict is present, the conflict check component 228 rolls back the changes so the changes are not committed, creating garbage that is discarded by the discarded change remover 232. The DQP 226 returns to a latest dependency and then executes a next iteration of the steps to solve the distributed execution statement 222 using the same or different nodes 118*a*-118*n*** as in the first iteration.

In examples where a conflict is not present, the commit component 230 commits the changes. To commit the changes, the commit component 230 upserts the name of each modified file to a table in the front end, such as a database stored in the data storage device 212. In some examples, this is an example of the system catalog 108. The table is in a temporary database. An index is included in the database that identifies the table and file name combination.

The discarded change remover 232 removes discarded changes for various reasons. For example, files in storage may be removed due to an aborted transaction, retry of a backend DML task, to optimize storage, or to drop or truncate a table or database. The discarded change remover 232 is a specialized processing unit, implemented on the processor 210 as an element of the distributed cloud layer 224, that operates as an automatic system task to clean up discarded files. The discarded change remover 232 receives, or obtains metadata regarding a particular file or table to clean up that includes the physical metadata, i.e., a sequence of file names within the table, a current low water mark transaction ID for the database, and any clone/reference counts for files if more than one that may be available.

In some examples, the system 200 is subject to data retention regulations. For example, the system 200 may be subject to regulations that comply with mandatory retention periods for data, such as customer data, personal data, and so forth. In these examples, the discarded change remover 232 obeys the data retention periods, policies, and regulations and discards data if and only if to do so does not violate the data retention regulations and policies.

It should be understood that the conflict check component 228 may execute the conflict check at various levels. In some examples, the conflict check component 228 checks for conflicts at the table level. However, in other examples, the conflict check component 228 checks for conflicts at the table name level, the file name level, the row group level, and so forth. In some examples, the conflict check component 228 executes more than one conflict check at different levels before the commit component 230) commits the changes. For example, the conflict check component 228 may check for conflicts at each of the table level and the file name level before the commit component 230) commits the changes.

The cloud server 236 includes one or more nodes 238. For example, the node(s) 238 includes a first node **238*a*, a second node 238*b*, and an nth node 238*n*. In some examples, the nodes 238*a*-238*n* are examples of the nodes 118*a*-118*n* illustrated in FIG. 1. The nodes 238 in FIG. 2 are presented for illustration only and should not be construed as limiting. The nodes 238 may include more or fewer than the three nodes 238*a*-238*n*** without departing from the scope of the present disclosure.

The system 200 further includes a cloud storage 242. In some examples, the cloud storage 242 is an example of the cloud storage 132. The cloud storage 242 is remote storage that stores at least a database including data that is changed or updated by execution of a distributed transaction.

Figure 3:
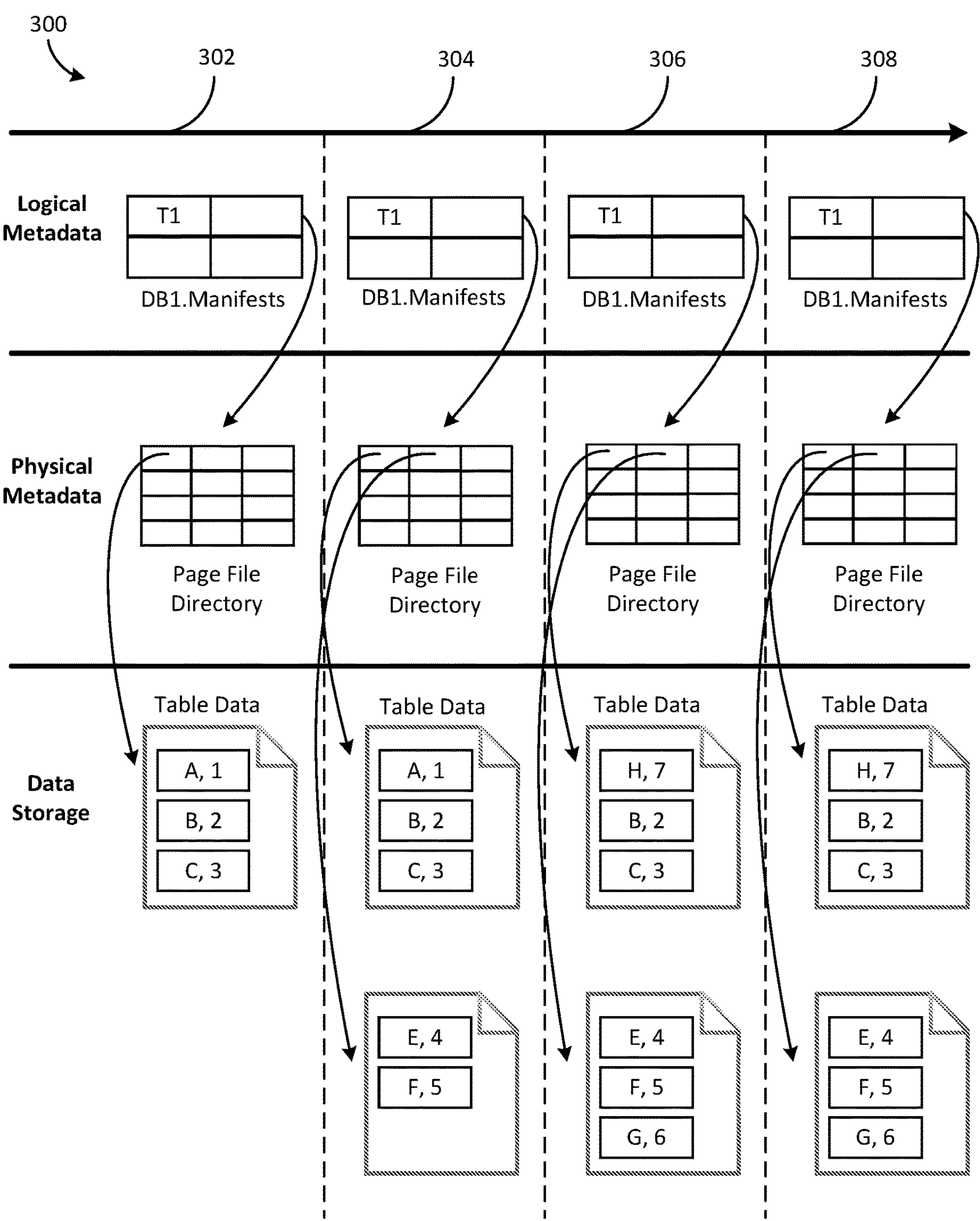
FIG. 3 illustrates a timeline of executing transaction tasks and committing changes according to an example.

FIG. 3 illustrates a timeline 300 of executing transaction tasks and committing changes according to an example. The example timeline 300 illustrated in FIG. 3 is presented for illustration only and should not be construed as limiting. Other examples of the timeline 300 may be used, including more, fewer, or different transaction tasks, without departing from the scope of the present disclosure.

The timeline 300 illustrates the logical metadata layer, the physical metadata layer, and the data storage layer. As illustrated in FIG. 3, the data is stored in the cloud storage 132 in a table format, such as in row-oriented page files on disks. The indexes of the data storage layer are auxiliary structures that support direct access to rows with given values in indexed columns.

The timeline 300 begins with a first step 302, or time. At the first step 302, three rows are loaded and committed, as shown in the data storage below. The table data include three rows: A, 1; B, 2; and C, 3. A manifest file T1 is written as logical metadata. At a second step 304, a bulk insert adds two new rows: E, 4; and F, 5, and the manifest file T1 is updated. At a third step 306, a first row, A, 1, is deleted and two more rows, H, 7 and G, 6, are added, and the manifest file T1 is updated. At a fourth step 308, the changes are committed. Accordingly, the timeline 300 illustrates how the logical metadata and physical metadata evolves over the course of a distributed transaction and how the outcome of the distributed transaction is recorded in order to achieve the desired isolation level.

Figure 4:
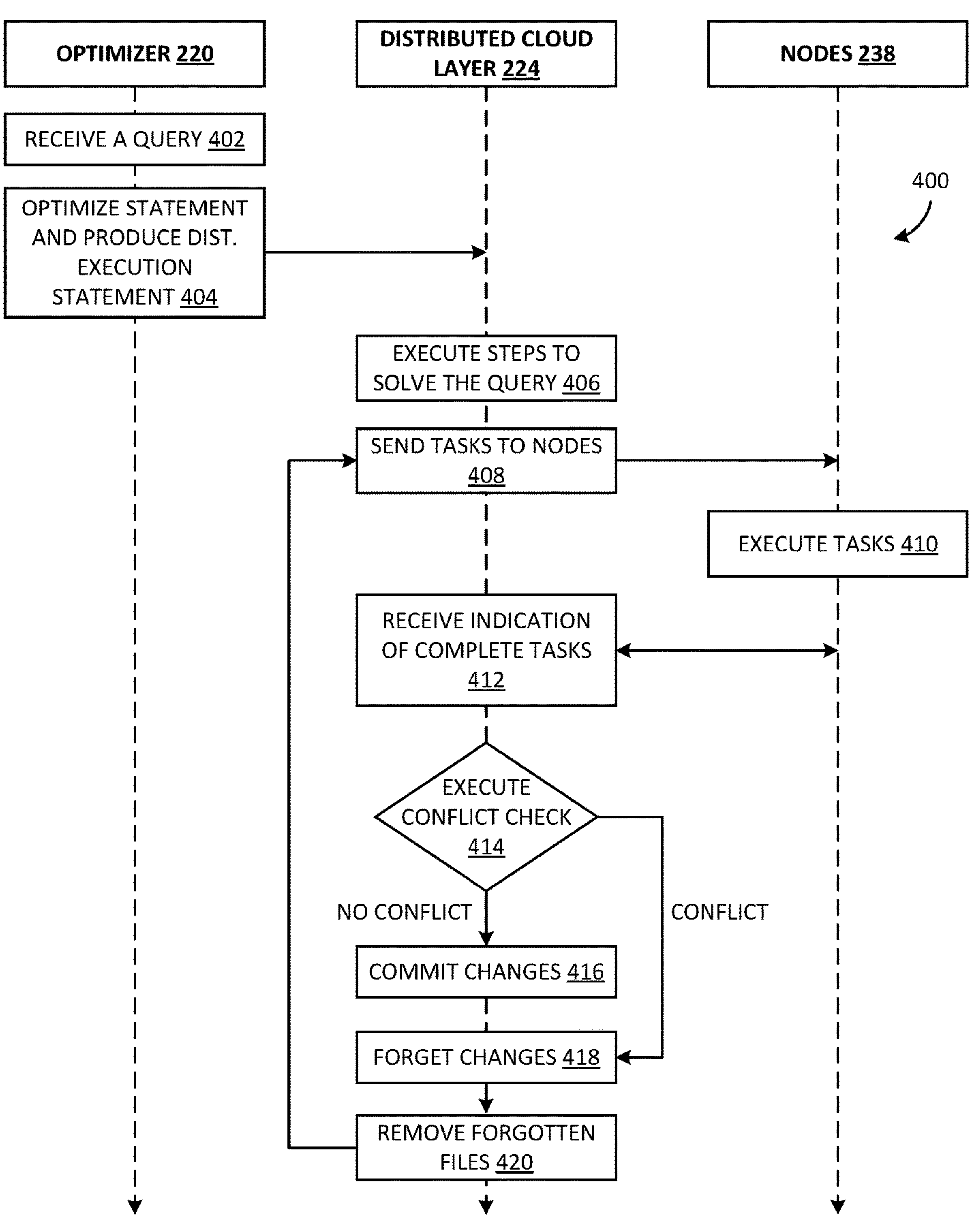
FIG. 4 illustrates an example computer-implemented method 400 of processing a distributed transaction.

FIG. 4 illustrates an example computer-implemented method 400 of processing a distributed transaction. The computer-implemented method 400 of FIG. 4 is provided for illustration only and should not be construed as limiting. Other examples of the computer-implemented method 400 can be used without departing from the scope of the present disclosure. In some examples, the computer-implemented method 400 is implemented by one or more components of the system 100 and/or the system 200.

The method 400 begins by the FEPL 102, and in particular the optimizer 220, receiving a query. In some examples, the query is received via an interface, such as the UI 218. In other examples, the query is received from an external device, such as the external device 240, that receives the query via an interface. The query is received as a DML (insert/update/delete) statement, either implicit or explicit, and includes instructions to insert data into one or more tables, update data included in one or more tables, and/or delete data included in one or more tables. As referenced herein, the database is stored on the cloud storage 242.

In operation 402, the optimizer 220 optimizes the received statement and produces a distributed execution statement 222. As described herein, the distributed execution statement 222 is a writable manifest file that contains the physical metadata changes required by the received query and instructions that include specific transaction tasks to perform the changes and a quantity of nodes needed to perform the specific transaction tasks. To optimize the received statement, the optimizer 220) determines the transaction tasks to be performed in order to process the distributed transaction in the received statement and estimates the computational resources needed to execute the determined transaction tasks. The distributed execution statement 222 is transmitted to the DQP 226.

In operation 406, the distributed cloud layer 224, in particular the DQP 226, executes the transaction steps to solve the query. For example, the DQP 226 determines the quantity of nodes 238 that are added to a pool, such as a first pool 130*a* or a second pool 130*b*, that are to perform the transaction tasks. The DQP 226 manages the nodes 238. For example, the DQP 226 determines which transaction tasks to assign to which nodes 238, taking into account dependencies, the number of nodes 238 available, and so forth. In operation 408, the DQP 226 transmits the transaction tasks to the nodes 238.

In operation 410, the one or more nodes 238 execute the transaction tasks passed down from the DQP 226. For example, each of the one or more nodes 238 executes a respective transaction task assigned by the DQP 226. In various examples, the transaction task may include to insert new data into a table, insert a new table into a database in the cloud storage 242, update existing data in a table, delete data from a table, delete an entire table from a database in the cloud storage 242, and so forth. In some examples, the one or more nodes 238 execute the respective transaction task asynchronously. Upon an individual node 238, e.g., the first node 238*a*, completing its assigned transaction task, the first node 238*a* sends an indication to the DQP 226 indicating the task has been completed. In operation 412, the DQP 226 receives the indication of the completed task(s). In some examples, the method 400 includes numerous iterations of operations 410 and 412. For example, one iteration includes the first node 238*a* completing its assigned transaction task and the DQP 226 receiving an indication of the completion of the transaction task from the first node 238*a*, another iteration includes the second node 238*b* completing its assigned transaction task and the DQP 226 receiving an indication of the completion of the transaction task from the second node 238*b*, and so forth until a final iteration where the final node 238*n* completes its assigned transaction task and the DQP 226 receives an indication of the completion of the transaction task from the final node 238*n*.

In operation 414, prior to committing the distributing transaction, the conflict check component 228 determines whether a conflict exists between completed transaction tasks by executing a conflict check, i.e., a write/write conflict detection process, on the completed transaction tasks. In some examples, as described herein, the conflict check component 228 executes a file level detection, as any current state of a table will have files in storage representing data that may be read as well as information regarding deletes. However, various examples are possible and the conflict check may be performed at any level of, including but not limited to the table name level, the file name level, the row group level, and so forth. In some examples, the conflict check component 228 executes the conflict check upon receiving an indication of any two completed transaction tasks. In other examples, the conflict check component 228 executes the conflict check upon receiving an indication that each of the assigned transaction tasks have been completed.

Based on the conflict check component 228 determining, in operation 414, that a conflict does not exist between the completed transaction tasks, the method 400 proceeds to operation 416 and the commit component 230 commits the changes made by completing the transaction tasks. By committing the changes, the commit component 230 writes the name of the updated table into a system table in the cloud storage 242. Thus, the changes are committed and made in the permanent storage based on the conflict check component 228 determining a conflict does not exist. In some examples, executing the transaction tasks at the node 238 level and then committing the changes to permanent storage at the distributed cloud layer 224 following a conflict check enables the distributed transactions to be processed on a multiple-table level, where multiple tables may be updated concurrently and asynchronously in order to process a particular distributed transaction.

Based on the conflict check component 228 determining, in operation 414, that a conflict does exist between the completed transaction tasks, the method 400 proceeds to operation 418 and the distributed cloud layer 224 forgets the changes made in the conflicting transaction tasks. In other words, the distributed cloud layer 224 elects to not commit the changes due to the conflict in the completed transaction tasks, and converts the non-committed, or discarded, changes to garbage. In operation 420, the discarded change remover 232 removes, or disposes of, the discarded changes. Following the discarded changes being removed, the method 400 returns to operation 408 and the DQP 226 sends the transaction tasks to one or more nodes 238 for processing, as those transaction tasks to be completed for the distributed transaction were not committed due to the conflict.

Figure 5A:
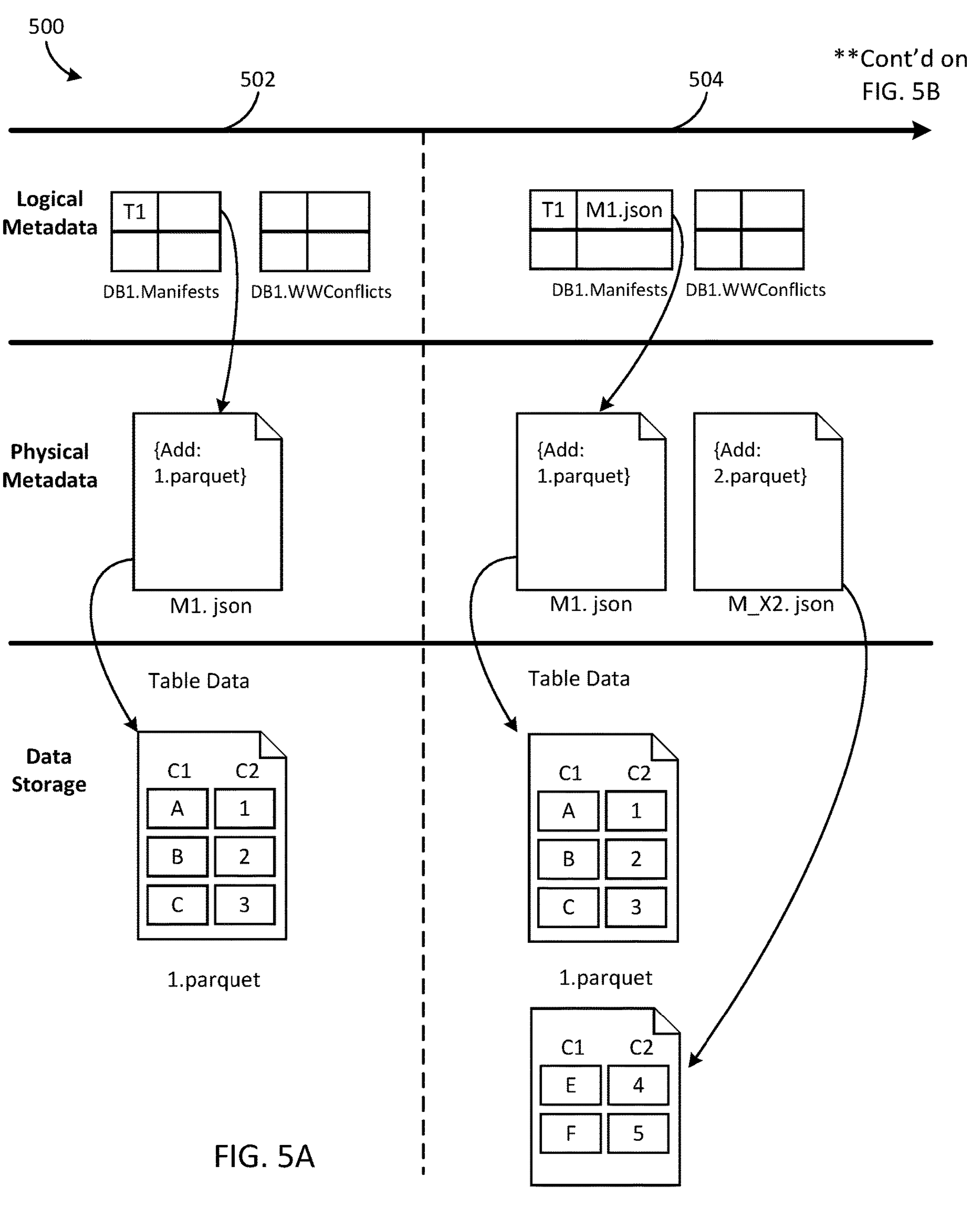
FIGS. 5A-5B illustrate an example timeline 500 of executing transaction tasks according to an example.
Figure 5B:
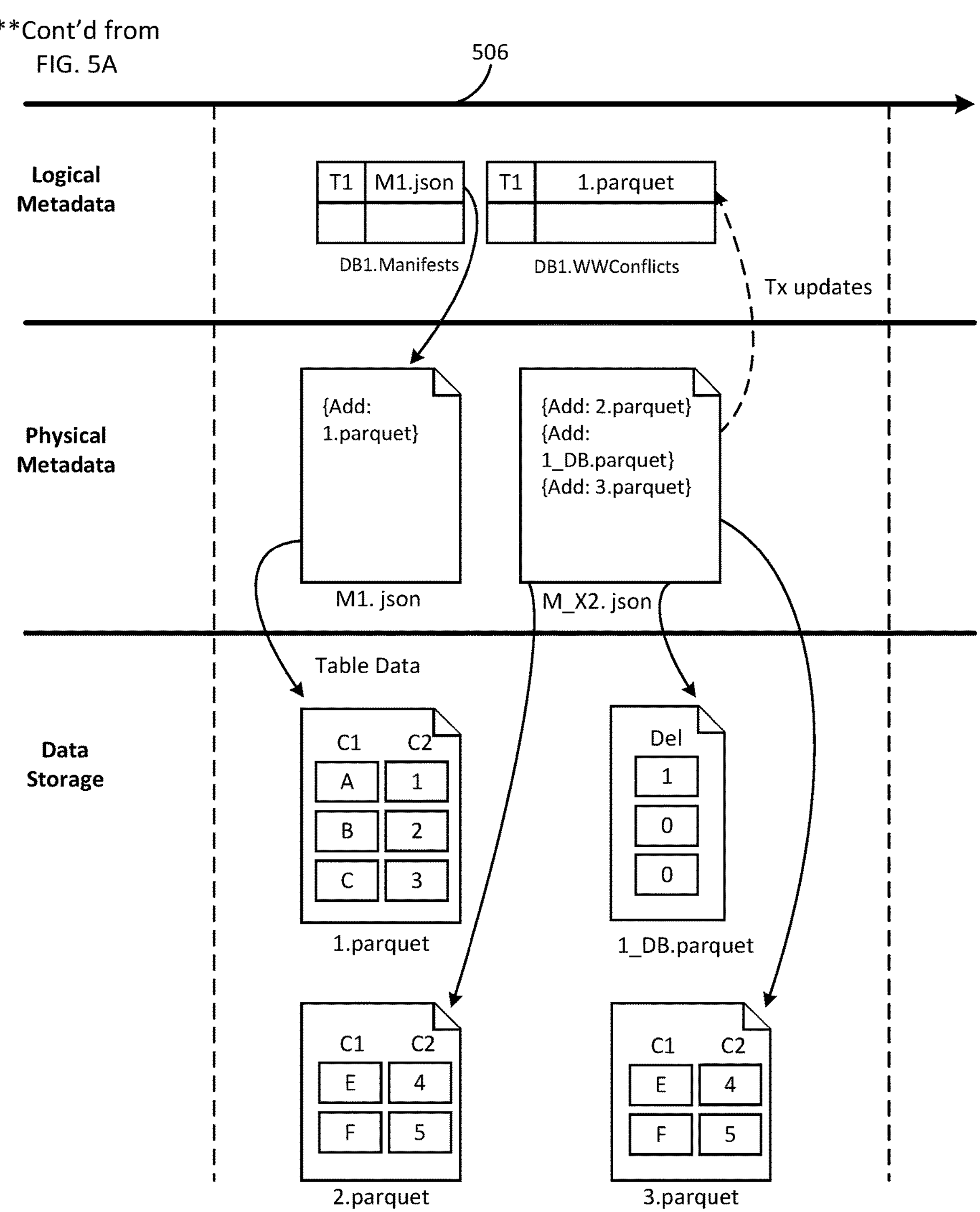

FIGS. 5A-5B illustrate an example timeline 500 of executing transaction tasks according to an example. The example timeline 500 illustrated in FIGS. 5A-5B is presented for illustration only and should not be construed as limiting. Other examples of the timeline 500 may be used, including more, fewer, or different transaction tasks, without departing from the scope of the present disclosure.

The timeline 500 begins with a first step 502, or time. At the first step 502, the data is loaded in the DB.1Manifests table. The DB.1Manifests table is an example of a manifest file as described herein, that contains the physical metadata changes required by the received query and instructions that include specific transaction tasks to perform the changes and a quantity of nodes needed to perform the specific transaction tasks. The DB.1Manifests file, at step 502, stores an evolution of the transactional state of the set of tables T1. The DB.1Manifests file includes a table with rows, where each row represents, for a given table T1, the sequence of manifest files that is an evolutionary but transactionally consistent state of how the table's data has evolved. In some examples, the DB.1Manifests file at step 502 includes a transaction timestamp and commit sequence number, which enables the DQP 226 to order the sequence of commits independently of the name of the file. Thus, the DB.1Manifests file enables consistent commits of changes across databases.

At a second step 504, two new rows are inserted in the file 2.parquet, which includes rows C1 and C2 on the back end. A new manifest M_X2.json, is created and the content of the M_X2.json is created by the node, or nodes, 238 that the transaction task of adding the new file 2.parquet is assigned to. In some examples, the M_X2.json file is a new writable manifest. As shown in the second step 504, at this time the changes have not yet been committed.

At a third step 506, as illustrated in FIG. 5B as a continuation of the timeline 500, one row is deleted by the 1_DB.parquet file and another two new rows are inserted in the 3.parquet file, which includes rows C1 and C2 on the back end, as additional transaction tasks assigned to another node 238. The M_X2.json file is updated at the third step 506 to include adding the 1_DB.parquet and 3.parquet files. Also at the third step 506, the 1.parquet file is added to the DB1.WWConflicts manifest, which is to be used by the conflict check component 228 to check for conflicts between the transaction tasks.

Following the third step 506, the conflict check component 228 executes a conflict check between the completed transaction tasks. In some examples, the conflict check component 228 determines whether a conflict exists, or does not exist, at the modified data level, such as the parquet file level as illustrated in FIGS. 5A-5B.

For example, FIGS. 6A-6D illustrate an example timeline 600 of executing transaction tasks, a conflict check, and committing changes according to an example. The example timeline 600 illustrated in FIGS. 6A-6D is presented for illustration only and should not be construed as limiting. Other examples of the timeline 600 may be used, including more, fewer, or different transaction tasks, without departing from the scope of the present disclosure.

Figure 6A:
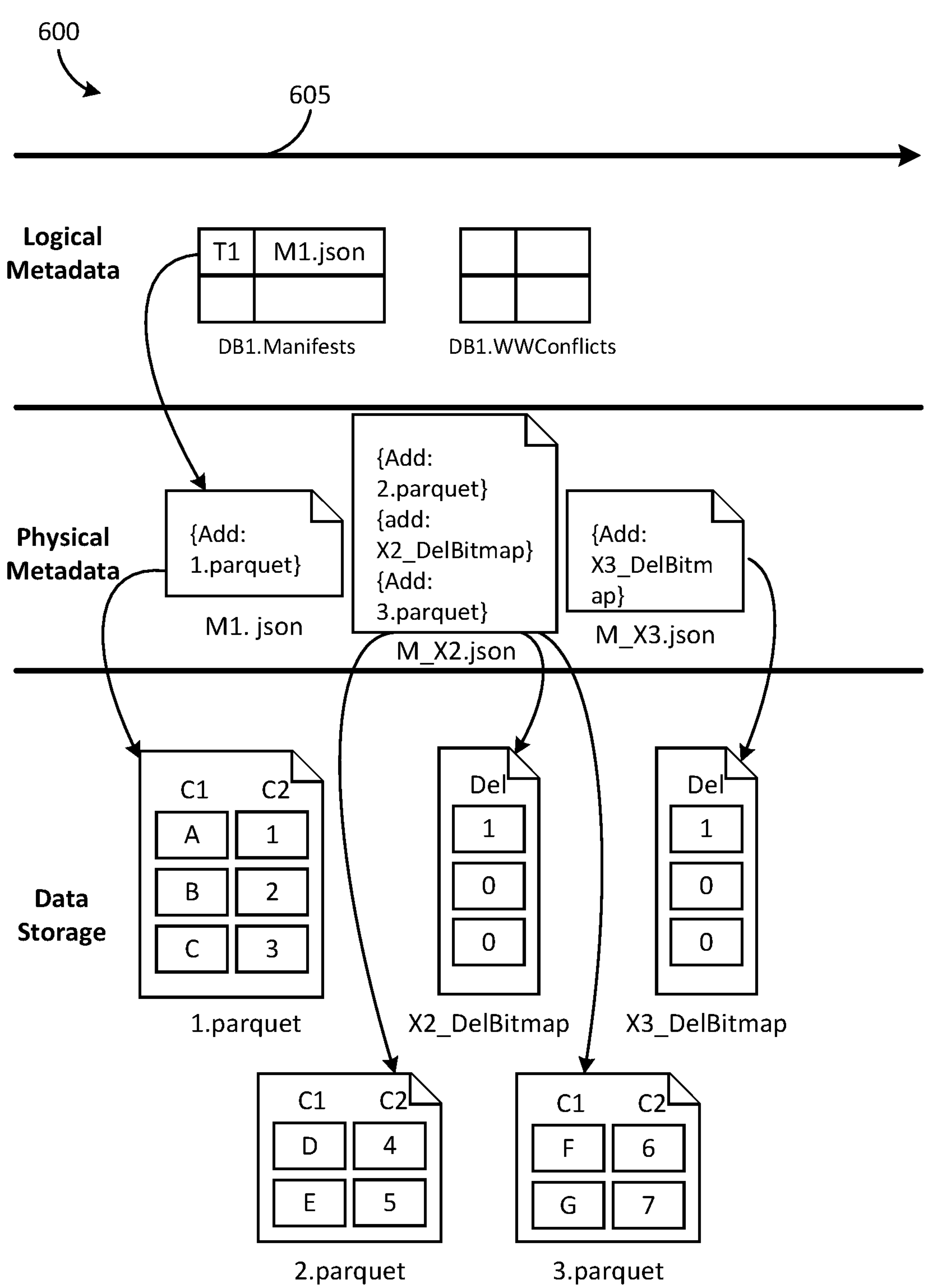
FIGS. 6A-6D illustrate an example timeline 600 of executing transaction tasks, a conflict check, and committing changes according to an example.
Figure 6B:
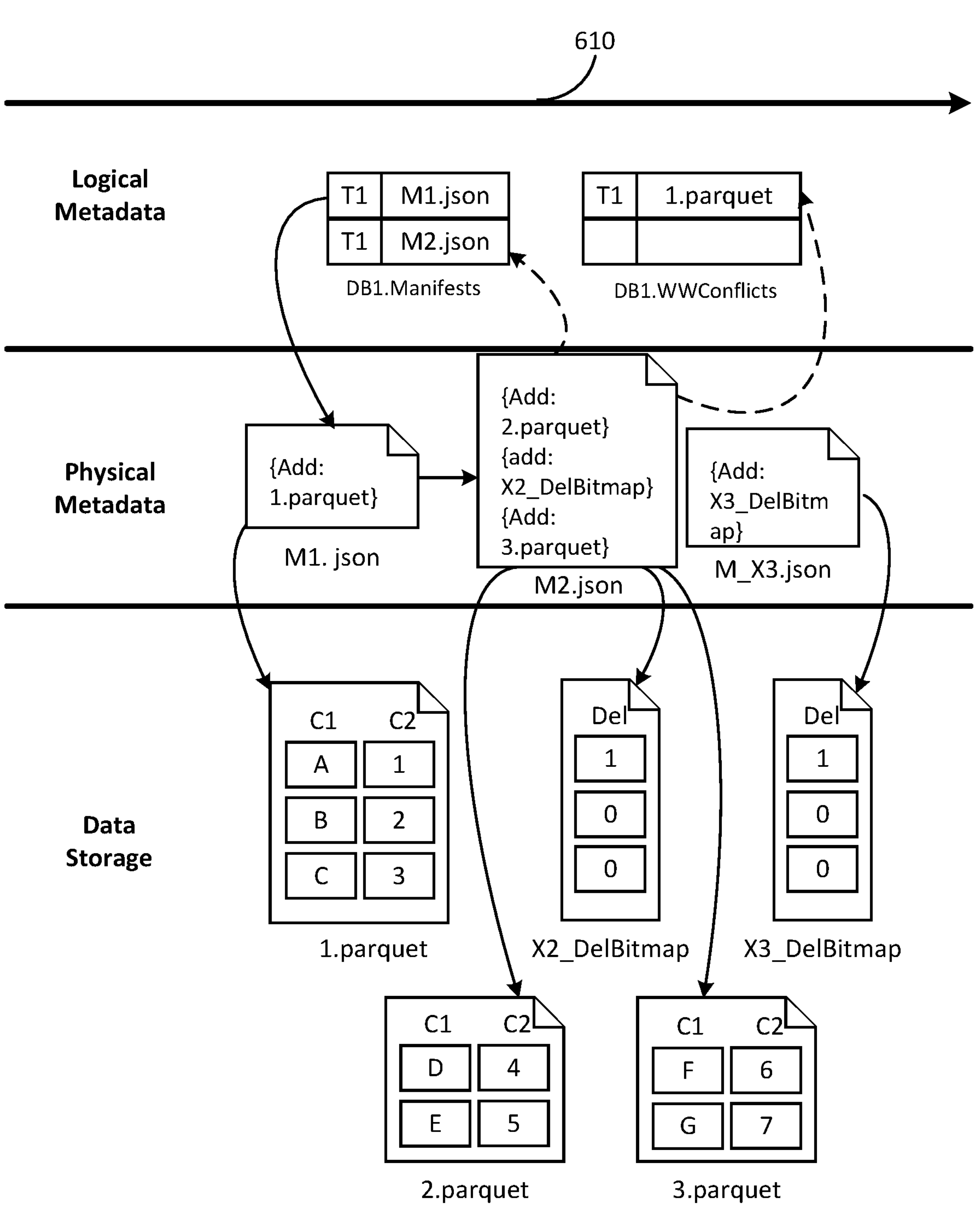

The timeline 600 begins with a first step 605, illustrated in FIG. 6A, where two new manifest files, M_X2.json and M_X3.json, are created. The manifest files M_X2.json and M_X3.json are created by one or more nodes 238 as part of executing transaction tasks assigned by the DQP 226. The conflict check component 228 executes a conflict check and determines a conflict does not exist between the M_X2.json file and the M1.json file. In FIG. 6B, the second step 610 illustrates the M_X2.json file being validated and committed to the DB1.Manifests file as M2.json in the T1 table. In other words, the state of T1 is updated to include the sequence of M1.json and M2.json.

Figure 6C:
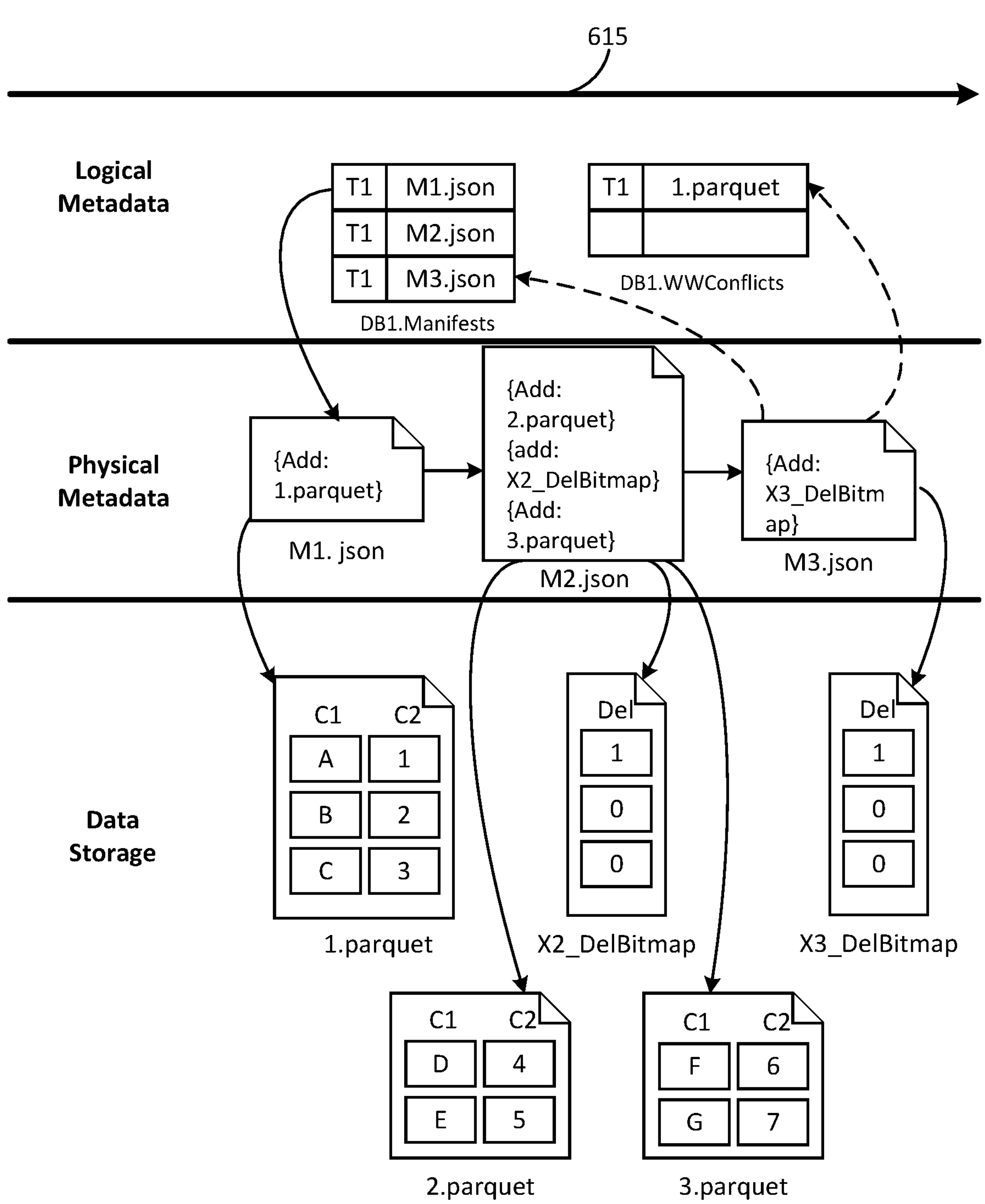

In FIG. 6C, the third step 615 illustrates a conflict check being executed between the DB1.Manifests file and the M_X3.json file. As shown in FIG. 6C, the M3.json file modifies the state of the 1.parquet file. This becomes a conflict, detected by the conflict check component 228, because of the name of the M2.json row in the DB1.Manifests file. Due to the conflict, the M3.json file fails to write. Thus, in a fourth step 620 illustrated in FIG. 6D, the changes in the M3.json file are rolled back, creating a need for the M3.json file and X3_DelBitmap file to be collected as garbage and discarded by the discarded change remover 232.

Various examples of the present disclosure provide storage optimization by implementing data compaction processes. Over time, the trickle of updates, inserts, and deletes may create a sub-par storage layout and deletes create inefficient scans. Thus, some examples compact data by reading only files that are known to contribute to poor scan performance and writes those files into a new set of files having a more efficient, and possibly even optimal, storage layout. This does not change the data itself, but only changes the physical structure of the data as it is organized and stored. In some examples, this is referred to as an alter index reorganization. In addition, due to the large number of physical metadata and manifest files, as well as the need for each read of a table to read all the physical metadata present, a snapshot may be created that reads all the physical metadata from a sequence of files and writes this into a single file, such as a parquet file. This compresses out add records with matching instructions to remove data, for example from the compaction of the data described herein.

FIGS. 7A-7D illustrate an example timeline 700 of executing transaction tasks, committing and validating data compaction, and creating a manifest snapshot according to an example. The example timeline 700 illustrated in FIGS. 7A-7D is presented for illustration only and should not be construed as limiting. Other examples of the timeline 700 may be used, including more, fewer, or different transaction tasks, without departing from the scope of the present disclosure.

Figure 7A:
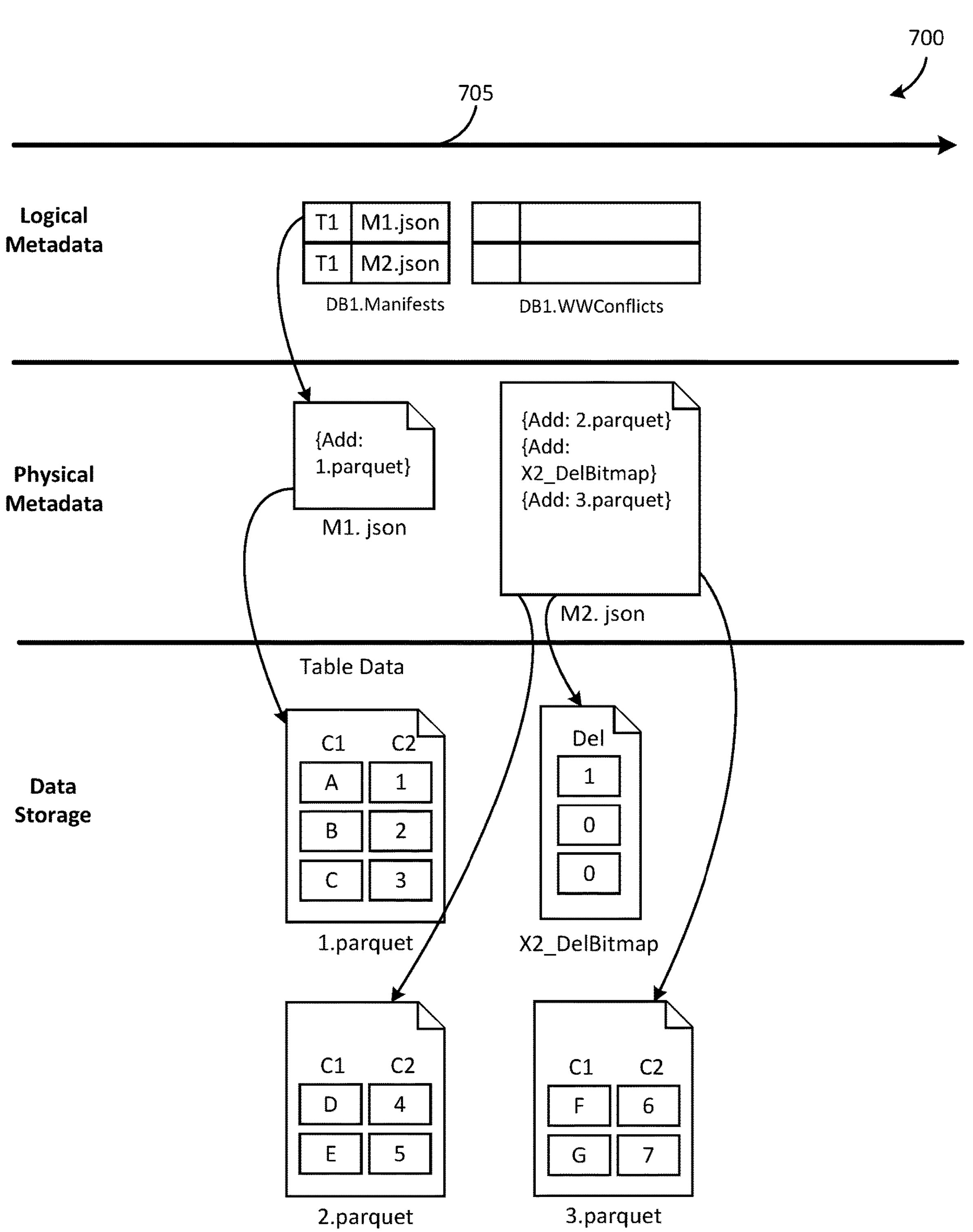
FIGS. 7A-7D illustrate an example timeline 700 of executing transaction tasks, committing and validating data compaction, and creating a manifest snapshot according to an example.
Figure 7B:
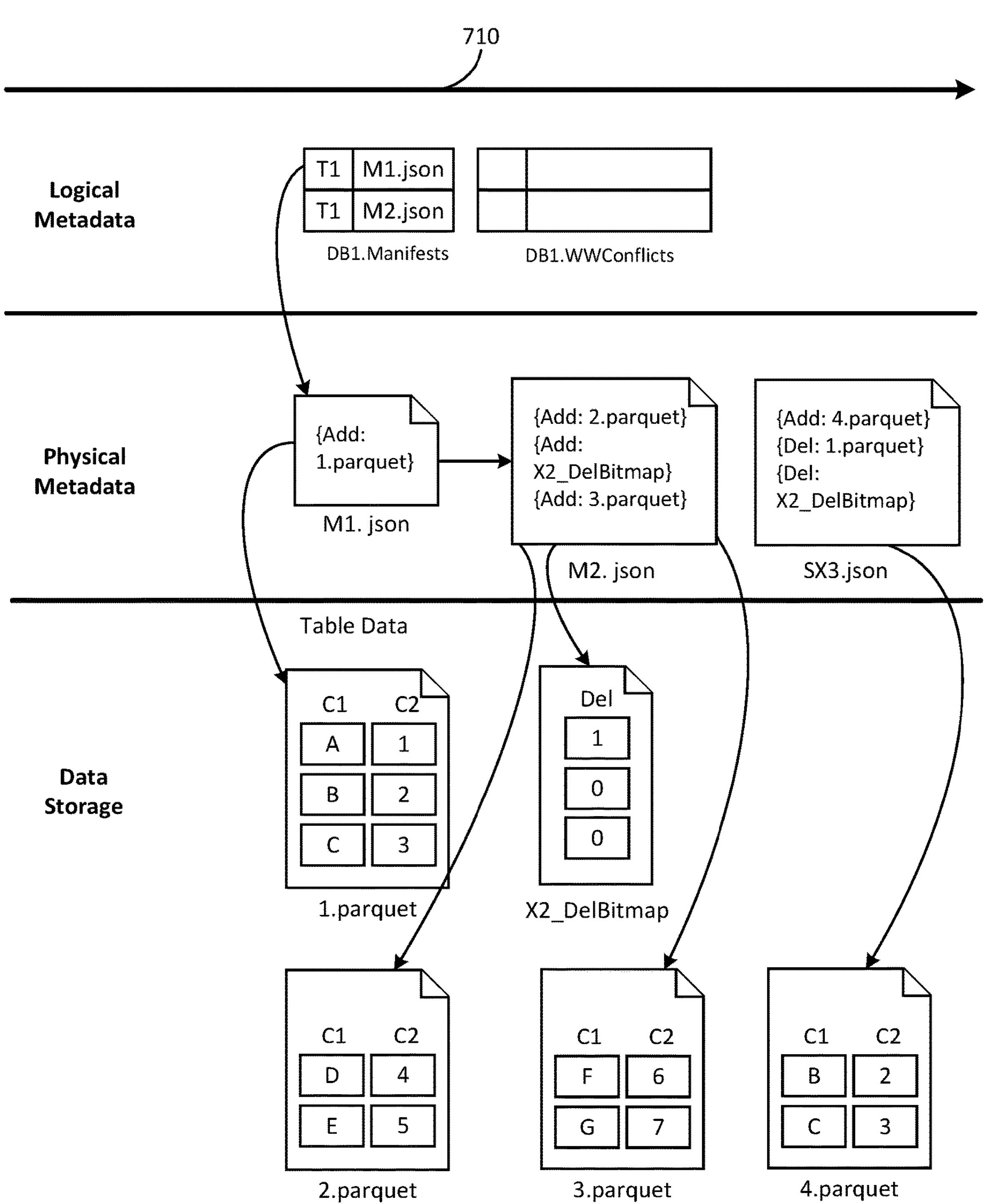
Figure 7C:
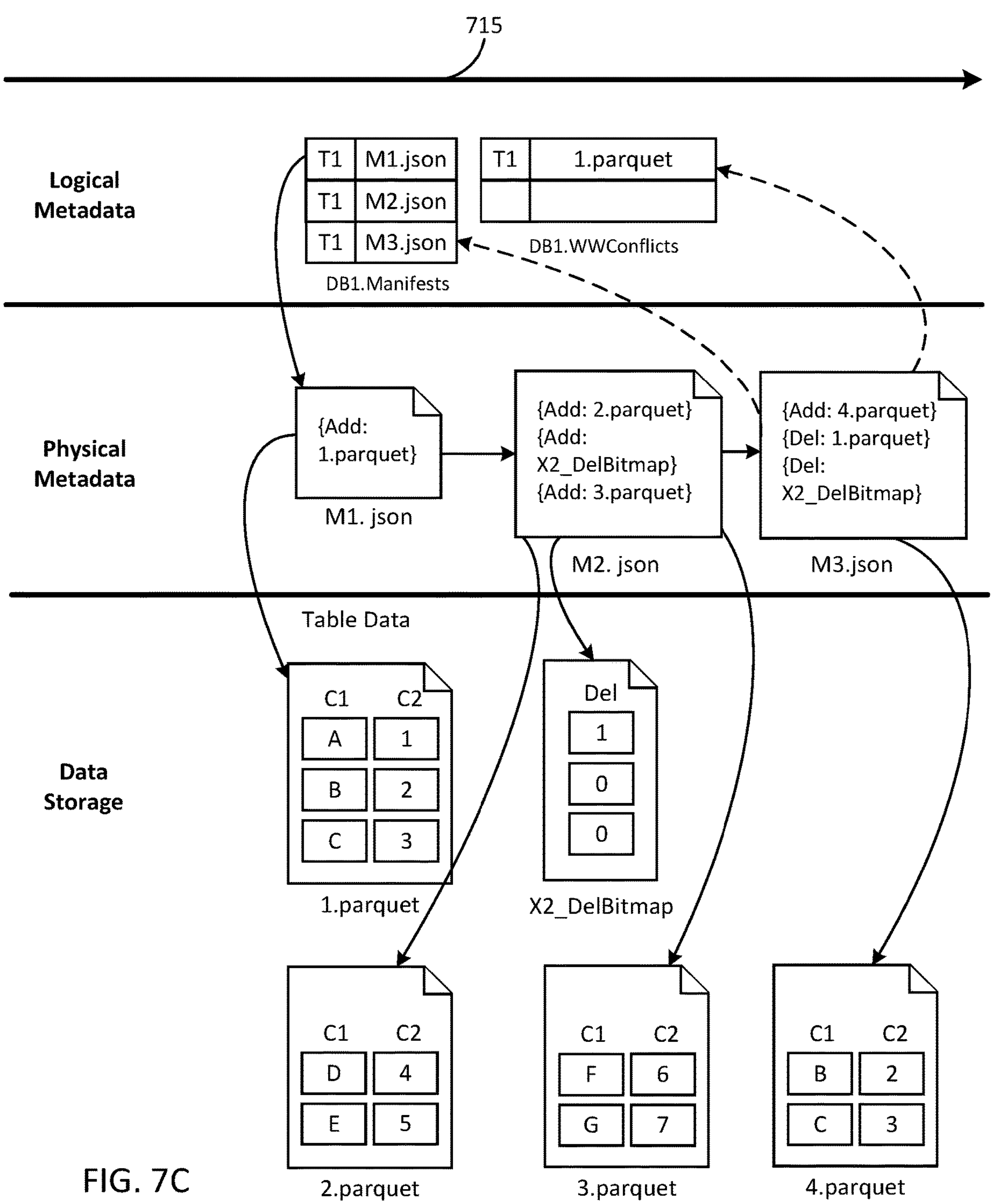
Figure 7D:
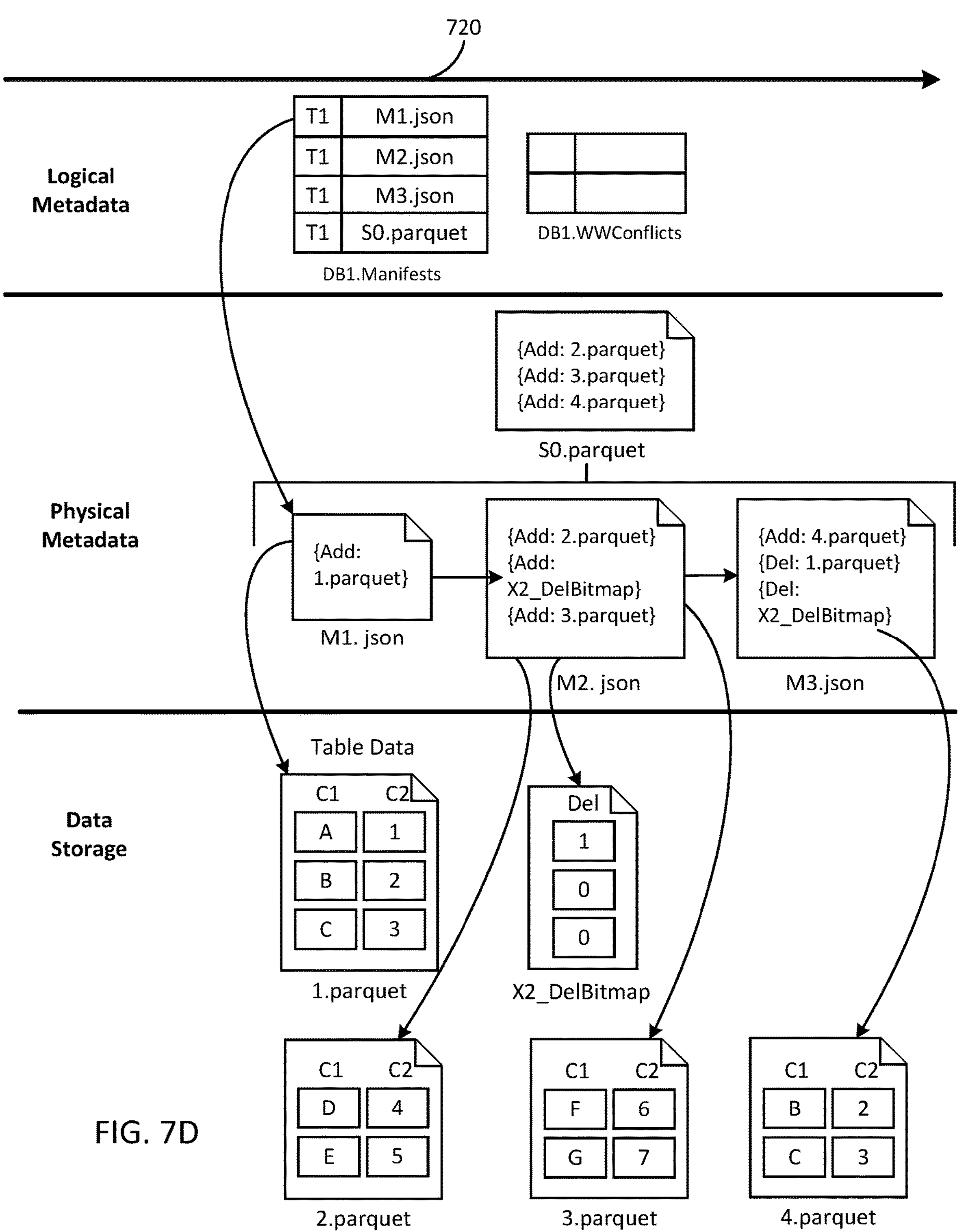

The timeline 700 begins with a first step 705, illustrated in FIG. 7A. In some examples, the first step 705 follows the fourth step 620, after the M3.json file and X3_DelBitmap file are discarded by the discarded change remover 232. Following this, the storage of T1 is suboptimal, as described herein, and a data compaction process is triggered. In a second step 710, illustrated in FIG. 7B, a system task with a transaction SX3 creates two new files, 4.parquet and SX3.json. The 4.parquet file contains the data previously contained in the 1.parquet file, while the SX3.json file is the manifest file. The data compaction has a dependency on the 1.parquet file, so at the validation step the 1.parquet file is written to the DB1.WWConflicts table, as shown at the third step illustrated in FIG. 7C. The conflict check component 228 executes a conflict check as described herein and, upon a conflict not being detected, SX3.json file is written to the DB1.Manifests table as M3.json. As shown in FIG. 7C, the M3.json file adds one new file, 4.parquet, and removes two other files, 1.parquet and X2_DelBitmap.

At the conclusion of the third step 715, the DB1.Manifests file includes an excess of manifest files. Thus, in the fourth step 720, illustrated in FIG. 7D, the DQP 226 generates, or creates, a snapshot of the manifest sequence M1.json, M2.json, and M3.json. The generated snapshot. S1.parquet, contains the net result of reading the sequence. It should be noted that the M3.json file removes the 1.parquet file, so 1.parquet does not appear in the snapshot S0.parquet.

In some examples, the distributed cloud layer 224, in particular the DQP 226, executes a table/database clone process. The DQP 226 copies the logical and physical metadata of a table, or database of tables, resulting in a transactionally consistent clone of the metadata. Once the clone occurs, i.e., the metadata has been copied, DML/DDL against one set of the table does not affect the clone of the data. This does result in reference counting of data files for garbage collection and retention. In some examples, the clone is implemented as a backup and restore version of the database. For example, one database, or subset of tables in the database, is updated as a current version, while the cloned version is maintained as a prior version, such as from one week in the past.

Figure 8A:
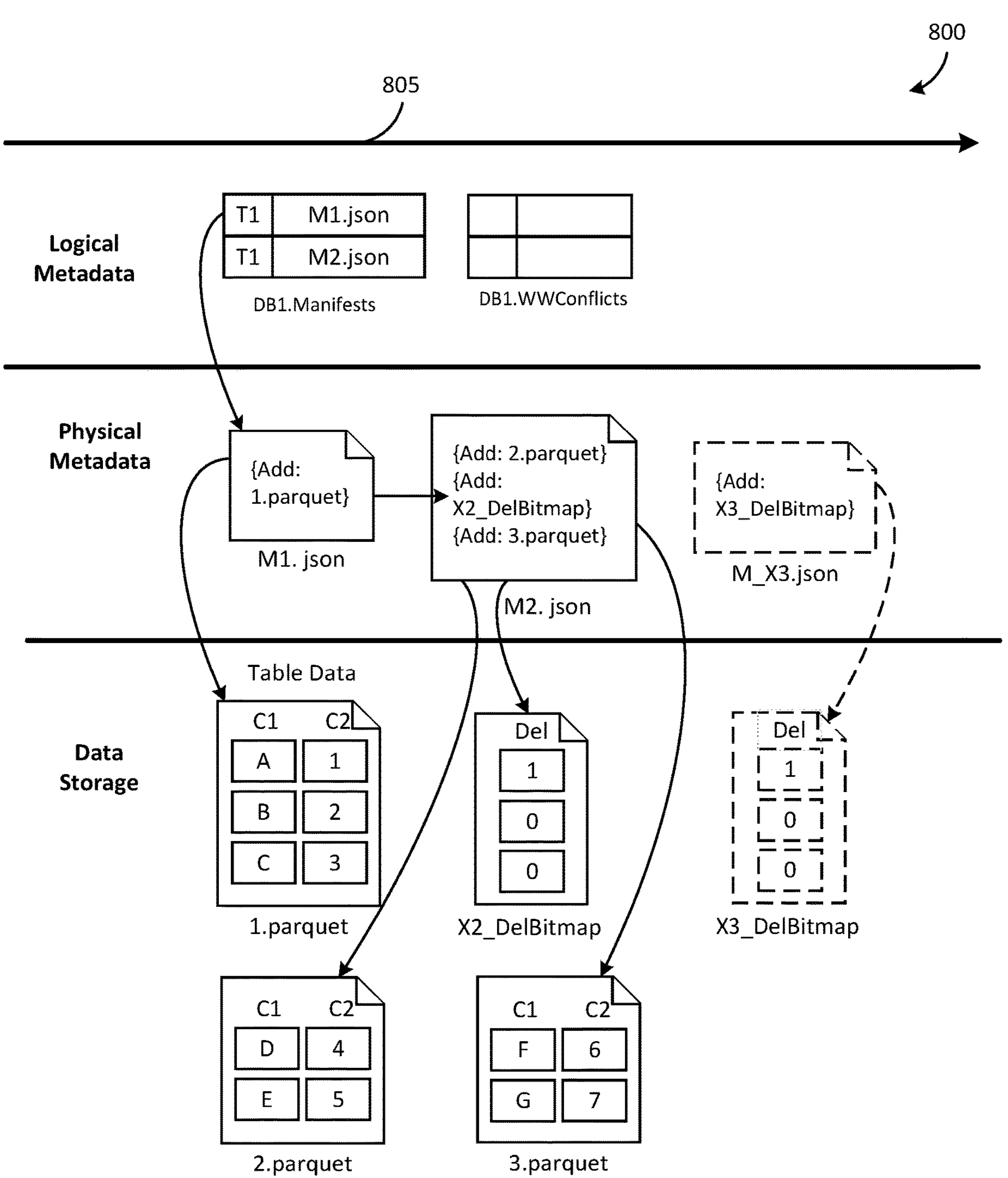
FIGS. 8A-8B illustrate an example timeline 800 of cloning a table according to an example.
Figure 8B:
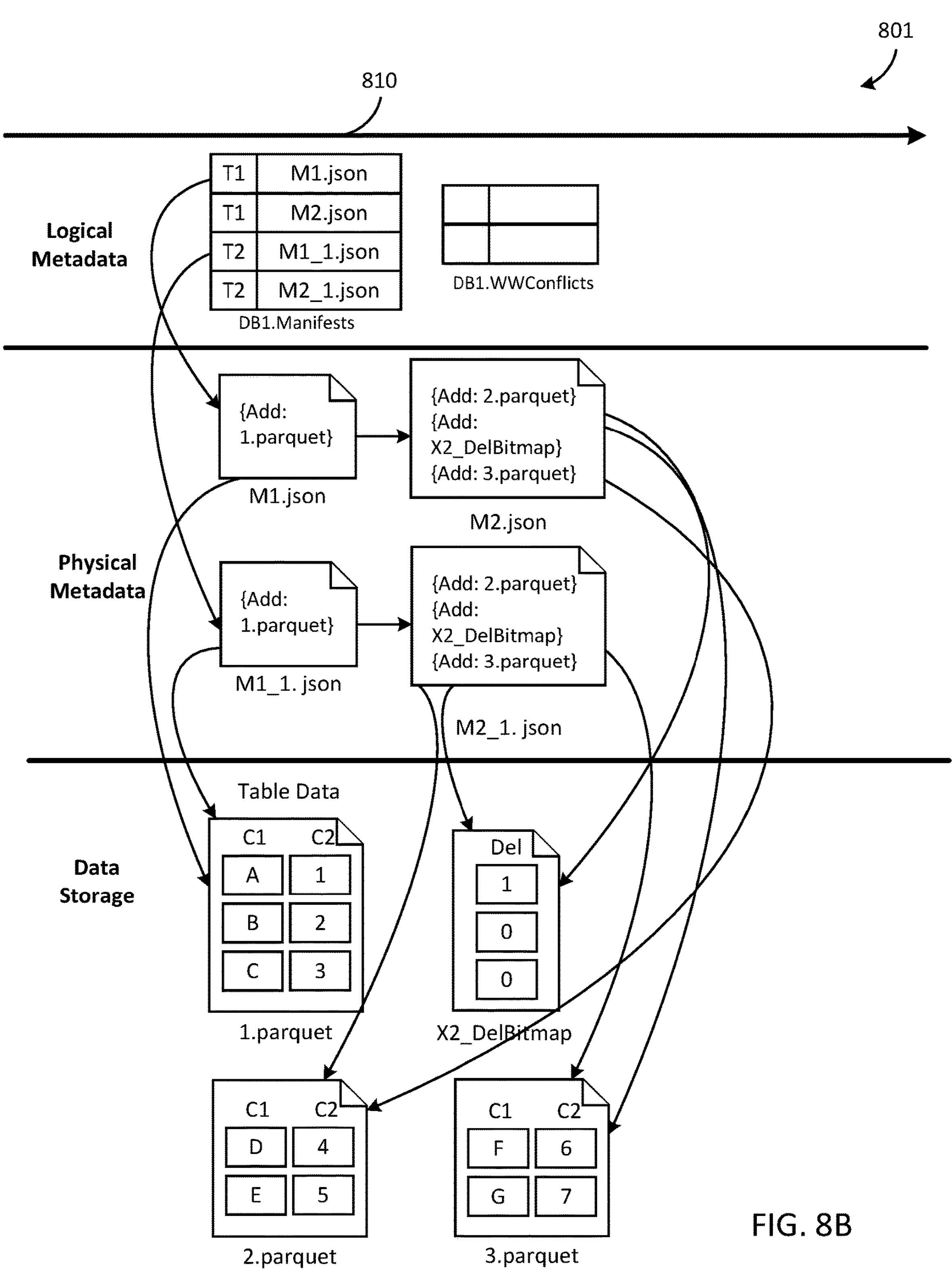

FIGS. 8A-8B illustrate an example timeline 800 of cloning a table according to an example. The example timeline 800 illustrated in FIGS. 8A-8B is presented for illustration only and should not be construed as limiting. Other examples of the timeline 800 may be used, including more, fewer, or different transaction tasks, without departing from the scope of the present disclosure.

Figure 6D:
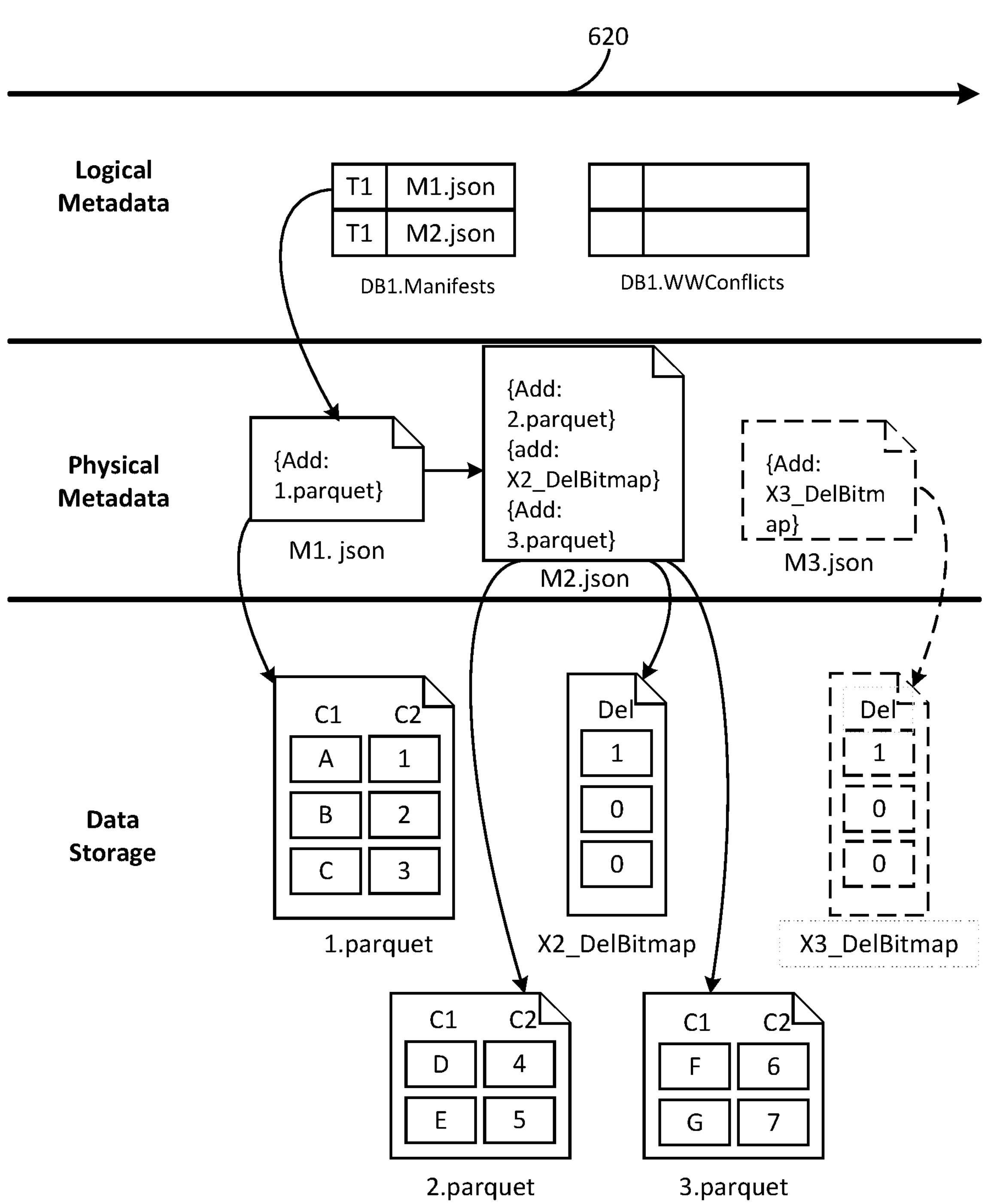

A first step 805 of the timeline, illustrated in FIG. 8A, may be an example of the rollback of the M3.json file as illustrated in FIG. 6D. In the second step 810, illustrated in FIG. 8B, the manifest files are copied, but the data itself is not copied. This results in two tables, T1 and T2, which point to the same data files and delete bitmaps. For example, as shown in FIG. 8B, T1 includes M1.json and M2.json files, while T2 includes M1_1.json and M2_1.json, which represent the copied metadata of M1.json and M2.json, respectively.

Figure 9:
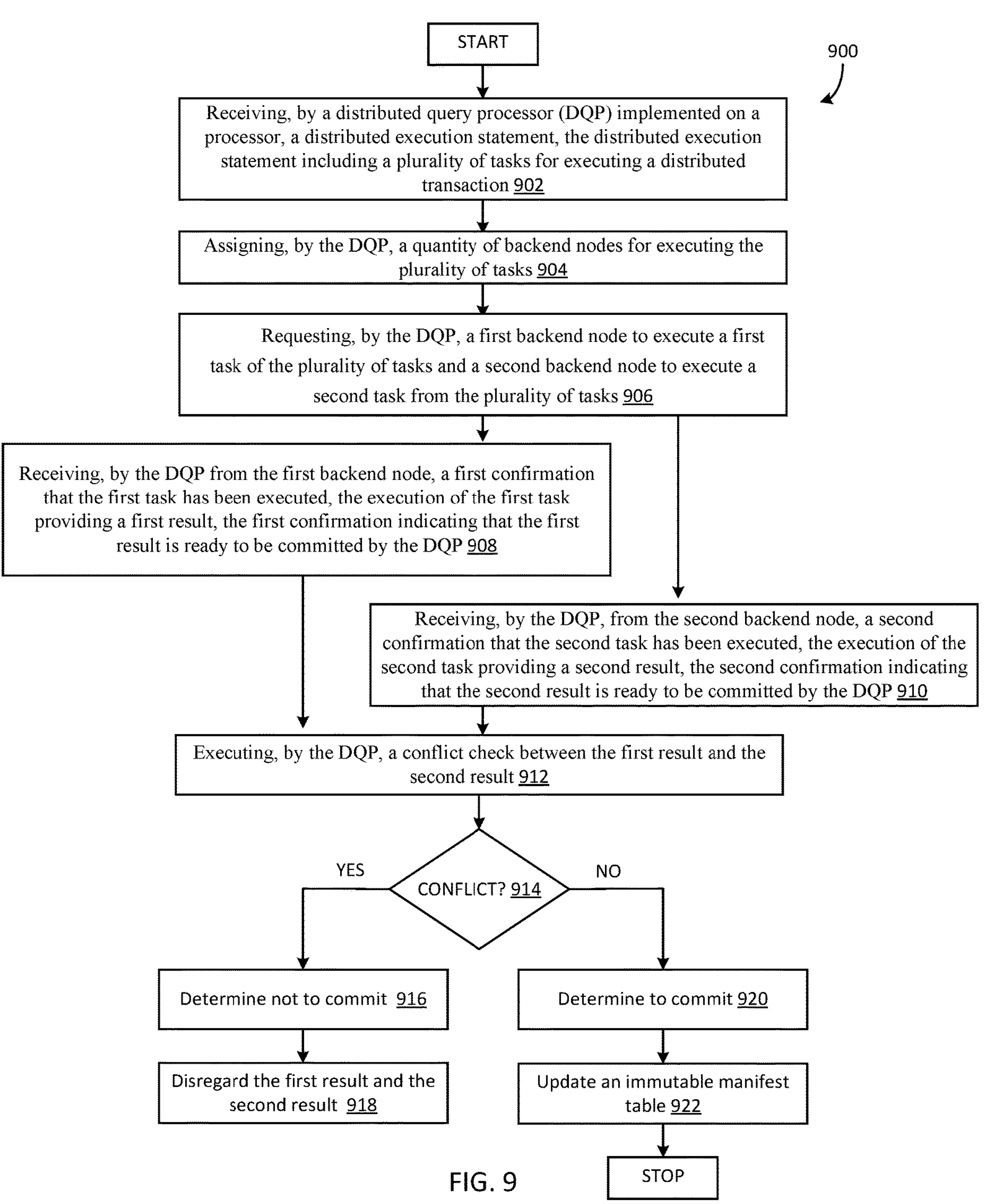
FIG. 9 is an example flowchart illustrating a computer-implemented method 900 of processing distributed transactions.

FIG. 9 is an example flowchart illustrating a computer-implemented method 900 of processing distributed transactions. The computer-implemented method 900 of FIG. 9 is provided for illustration only and should not be construed as limiting. Other examples of the computer-implemented method 900 can be used without departing from the scope of the present disclosure. In some examples, the computer-implemented method 900 is implemented by one or more components of the computing device 202 and/or the system 100, such as the DQP 110 and the DQP 226.

The method 900 begins where a distributed execution statement 222 is received at 902 by the DQP 110. The distributed execution statement including a plurality of tasks for executing a distributed transaction 902. The distributed execution statement 222 includes a plurality of tasks for executing a query and a table to be modified by the executed query. In some examples, the distributed execution statement 22 includes a first table and second table to be modified by the executed query.

In operation 904, the DQP 110 assigns a quantity of backend nodes (e.g., a first backend node 118*a* and a second backend node 118*b*) for executing the plurality of tasks. At 906 the DQP 110 requests the first backend node 118*a* to execute a first task of the plurality of tasks and the second backend node 118*b*) to execute a second task from the plurality of tasks. In operation 908, the DQP 110 receives, from the first backend node 118*a*, a first confirmation that the first task has been executed. The execution of the first task providing a first result. In some examples, the first confirmation indicates that the first result is ready to be committed by the. In operation 908, the DQP 110 receives, from the second backend node 118*b*, a second confirmation that the second task has been execute. The execution of the second task providing a second result. In some examples, the second confirmation indicating that the second result is ready to be committed by the DQP 110. In some examples, the distributed transaction comprises the first result and the second result. Prior to committing the distributed transaction, a writable manifest file in storage with references to the first result and the second result updated. In some examples, each of the first result and the second result comprises one of the following: new data in a table in a database in cloud storage, an update to existing data in the table, a removal of data from the table, a removal of the table, or a new table in the database in the cloud storage. In some examples, each of the first task and the second task comprises: reading data from storage based on a level of isolation identified by the DQP 110, and based on the data, executing the first task and the second task.

In one example, the DQP 110 assigns the first backend node 118*a* to a first pool, such as the first pool 130*a*, and the second backend node 118*b* to a second pool, such as the second pool 130*b*. As described herein, the pools 130*a*, 130*b* are implemented in order to centralize the storage, so that the node(s) in each respective pool are able to pull data from the same cache to execute their respective tasks. In some examples, based on the assignations of the first task to the first node and the second task to the second node, the DQP 110 generates a topology map that maps the first task to the first backend node and the second task to the second backend node, including a dependency of the second task on the first task. In addition, the first backend node 118*a* and the second backend node 118*b* are not required to be available until the distributed transaction is committed. That is, once each of the first backend node 118*a* and the second backend node 118*b* have executed their respective tasks, their respect results (e.g., the first result and the second result) are committable (e.g., ready to be committed by the DQP 110) without the need for any additional input from the first backend node 118*a* and the second backend node 118*b*. Thus, upon execution of a task, each of the first backend node 118*a* and the second backend node 118*b* can be deallocated, and once deallocated, each of the first backend node 118*a* and the second backend node 118*b* are made available for another task to execute by the same DQP 110 or another DQP.

As explained above, if a backend node assigned to a task cannot execute the task, the DQP 110 reassigns the task to another available backend node. For example, the DQP 110 request a third backend node to execute a third task from the plurality of tasks, but determines that the third backend node failed to execute the third task. As such, upon determining the third backend node failed to execute the third task, the DQP 110 re-assigns the third task to a fourth backed node.

In operation 912, the DQP 110 executes a conflict check to determine whether a conflict exists between the first result and the second result. Based on the DQP 110 determining one or both of the first result conflicting with the second result conflict and the second result conflicting with the first result, the method 900 proceeds to operation 916 and determines not to commit the first made by the execution of the first task and the second task to the table. In operation 918, the first result and the second result are discarded, such as by the discarded changes remover 232 as described herein. In operation 920, based on the DQP 110 determining that neither the first result conflicts with the second result conflict nor the second result conflicts with the first result, at 922, the DQP 110 commits distributed transaction. In some examples, committing the distributed transaction includes causing the writable manifest file to be immutable in storage (e.g., the cloud storage 132), and writing a name of the immutable manifest file into a table of committed manifest files in the cloud storage 132.

Additional Examples

Although described herein as including transaction tasks and then conducting conflict checks for write-write conflict detection, various examples are possible. The present solutions are extendable to other areas, including RCSI. In addition, serializability is achievable through the addition of both read-write conflict detection and write-read conflict detection. In some examples, read uncommitted could be performed by unioning all in flight writeable manifests for each table with the committed state for each statement.

Exemplary Operating Environment

Figure 10:
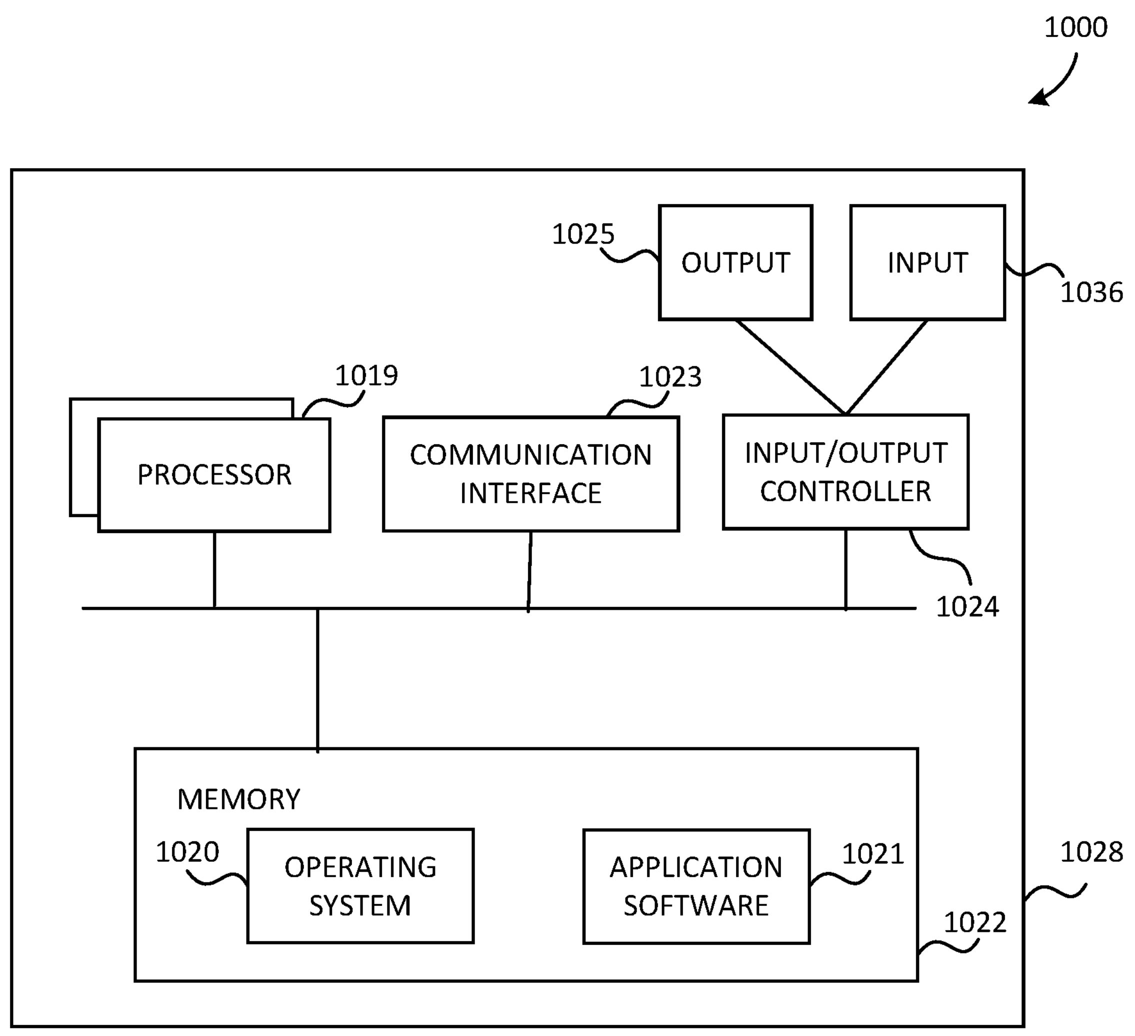
FIG. 10 is a block diagram of an example computing device for implementing examples of the present disclosure.

The present disclosure is operable with a computing apparatus according to an example as a functional block diagram 1000 in FIG. 10. In an example, components of a computing apparatus 1028 may be implemented as a part of an electronic device according to one or more examples described in this specification. For example, the computing apparatus 1028 can be the computing device 202 illustrated in FIG. 2. The computing apparatus 1028 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hardcoded machine. Platform software comprising an operating system 1020 or any other suitable platform software may be provided on the apparatus 1028 to enable application software 1021 to be executed on the device.

Computer executable instructions may be provided using any computer-readable media that are accessible by the computing apparatus 1028. Computer-readable media may include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1028, it will be appreciated by a person skilled in the art, that the storage may be distributed or located remotely and accessed via a network or other communication link (e.g., using a communication interface 1023).

In some examples, the computer-readable media includes instructions that, when executed by the processor 1019, execute instructions for the DQP 226.

The computing apparatus 1028 may comprise an input/output controller 1024 configured to output information to one or more output devices 1025, for example a display or a speaker, which may be separate from or integral to the electronic device. For example, the output device 1025 can be a user interface. The input/output controller 1024 may also be configured to receive and process an input from one or more input devices 1026, for example, a keyboard, a microphone, or a touchpad. In some examples, the one or more input devices 1026 is an input reception module. In one example, the output device 1025 may also act as the input device. An example of such a device may be a touch sensitive display that functions as both the input/output controller 1024. The input/output controller 1024 may also output data to devices other than the output device, e.g., a locally connected printing device. In some examples, a user may provide input to the input device(s) 1026 and/or receive output from the output device(s) 1025.

The functionality described herein can be performed, at least in part, by one or more hardware logic components. According to an example, the computing apparatus 1028 is configured by the program code when executed by the processor 1019 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs). System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a key board or pointing device, via gesture input, proximity input (such as by hovering), and/or via voice input.

In examples involving a general-purpose computer, aspects of the disclosure transform the general-purpose computer into a special-purpose computing device when configured to execute the instructions described herein.

An example computer-implemented method for processing a distributed transaction includes receiving, by a distributed query processor (DQP) implemented on a processor, a distributed execution statement, the distributed execution statement including a plurality of tasks for executing a distributed transaction; assigning, by the DQP, a quantity of backend nodes for executing the plurality of tasks; requesting, by the DQP, a first backend node to execute a first task of the plurality of tasks; requesting, by the DQP, a second backend node to execute a second task from the plurality of tasks; receiving, by the DQP from the first backend node, a first confirmation that the first task has been executed, the execution of the first task providing a first result, the first confirmation indicating that the first result is ready to be committed by the DQP; receiving, by the DQP, from the second backend node, a second confirmation that the second task has been executed, the execution of the second task providing a second result, the second confirmation indicating that the second result is ready to be committed by the DQP; executing, by the DQP, a conflict check between the first result and the second result; and based on determining the first result does not conflict with the second result, committing, by the DQP, the distributed transaction.

An example system for processing a distributed transaction includes a plurality of backend nodes communicatively coupled to the storage; a distributed query processor (DQP) configured to perform the following operations: receiving a distributed execution statement, the distributed execution statement including a plurality of tasks for executing a distributed transaction; assigning a quantity of the plurality of backend nodes for executing the plurality of tasks; requesting a first backend node from the assigned quantity of the plurality of backend nodes to execute a first task of the plurality of tasks; requesting a second backend node from the assigned quantity of the plurality of backend nodes to execute a second task from the plurality of tasks; receiving, from the first backend node, a first confirmation that the first task has been executed, the execution of the first task providing a first result, the first confirmation indicating that the first result is ready to be committed by the DQP; receiving, from the second backend node, a second confirmation that the second task has been executed, the execution of the second task providing a second result, the second confirmation indicating that the second result is ready to be committed by the DQP; executing a conflict check between the first result and the second result; and based on determining the first result does not conflict with the second result, committing the distributed transaction.

An example computer-readable medium comprising computer-executable instructions that, when executed by a distributed query processor (DQP) implemented on a processor, cause the processor to perform the following operations to receiving a distributed execution statement, the distributed execution statement including a plurality of tasks for executing a distributed transaction; assigning a quantity of backend nodes for executing the plurality of tasks; requesting a first backend node to execute a first task of the plurality of tasks; requesting a second backend node to execute a second task from the plurality of tasks; receiving, from the first backend node, a first confirmation that the first task has been executed, the execution of the first task providing a first result, the first confirmation indicating that the first result is ready to be committed by the DQP; receiving, from the second backend node, a second confirmation that the second task has been executed, the execution of the second task providing a second result, the second confirmation indicating that the second result is ready to be committed by the DQP; executing a conflict check between the first result and the second result; and based on determining the first result does not conflict with the second result, committing, by the DQP, the distributed transaction Alternatively, or in addition to the other examples described herein, examples include any combination of the following:

- wherein the distributed transaction comprises the first result and the second result;
- wherein each of the first result and the second result comprises one of the following: new data in a table in a database in cloud storage, an update to existing data in the table, a removal of data from the table, a removal of the table, or a new table in the database in the cloud storage;
- wherein each of the first task and the second task comprises: reading data from storage based on a level of isolation identified by the DQP, and based on the data, executing the first task and the second task;
- wherein the method further comprises, prior to committing the distributed transaction, updating a writable manifest file in storage with references to the first result and the second result;
- wherein committing the distributed transaction comprises:
- causing the writable manifest file to be immutable in storage; and
  - writing a name of the immutable manifest file into a table of committed manifest files in the storage;
  - further comprising based on determining the first result does conflict with the second result, do not commit the distributed transaction, and wherein the name of the writable manifest file not written into the table of committed manifest files;
  - further comprising: requesting, by the DQP, a third backend node to execute a third task from the plurality of tasks; determining, by the DQP, that the third backend node failed to execute the third task; and upon determining the third backend node failed to execute the third task, re-assigning, by the DQP, the third task to a fourth backed node; and
  - further comprising: prior to committing the distributed transaction: based on receiving the first confirmation, deallocating the first backend node; and based on receiving the second confirmation, deallocating the second backend node.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A computer-implemented method comprising:

receiving, by a distributed query processor (DQP) implemented on a processor, a distributed execution statement, the distributed execution statement including a plurality of tasks for executing a distributed transaction;

assigning, by the DQP, a quantity of backend nodes for executing the plurality of tasks;

requesting, by the DQP, a first backend node to execute a first task of the plurality of tasks;

requesting, by the DQP, a second backend node to execute a second task from the plurality of tasks;

receiving, by the DQP from the first backend node, a first confirmation that the first task has been executed, the execution of the first task providing a first result, the first confirmation indicating that the first result is ready to be committed by the DQP;

receiving, by the DQP, from the second backend node, a second confirmation that the second task has been executed, the execution of the second task providing a second result, the second confirmation indicating that the second result is ready to be committed by the DQP;

executing, by the DQP, a conflict check between the first result and the second result; and based on determining the first result does not conflict with the second result, committing, by the DQP, the distributed transaction.

2. The computer-implemented method of claim 1, wherein the distributed transaction comprises the first result and the second result; and wherein the first task is different than the second task.

3. The computer-implemented method of claim 2, wherein each of the first result and the second result comprises one of the following: new data in a table in a database in cloud storage, an update to existing data in the table, a removal of data from the table, a removal of the table, or a new table in the database in the cloud storage.

4. The computer-implemented method of claim 3, wherein each of the first task and the second task comprises: reading data from storage based on a level of isolation identified by the DQP, and based on the data, executing the first task and the second task.

5. The computer-implemented method of claim 3, wherein the method further comprises, prior to committing the distributed transaction, updating a writable manifest file in storage with references to the first result and the second result.

6. The computer-implemented method of claim 5, wherein committing the distributed transaction comprises:

causing the writable manifest file to be immutable in storage; and writing a name of the immutable manifest file into a table of committed manifest files in the storage.

7. The computer-implemented method of claim 1, further comprising based on determining the first result does conflict with the second result, do not commit the distributed transaction, and wherein a name of the writable manifest file is not written into the table of committed manifest files.

8. The computer-implemented method of claim 1, further comprising:

requesting, by the DQP, a third backend node to execute a third task from the plurality of tasks;

determining, by the DQP, that the third backend node failed to execute the third task; and upon determining the third backend node failed to execute the third task, re-assigning, by the DQP, the third task to a fourth backed node.

9. The computer-implemented method of claim 1, further comprising:

prior to committing the distributed transaction:

based on receiving the first confirmation, deallocating the first backend node; and based on receiving the second confirmation, deallocating the second backend node.

10. A system comprising:

a plurality of backend nodes communicatively coupled to the storage;

a distributed query processor (DQP) configured to perform the following operations:

receiving a distributed execution statement, the distributed execution statement including a plurality of tasks for executing a distributed transaction;

assigning a quantity of the plurality of backend nodes for executing the plurality of tasks;

requesting a first backend node from the assigned quantity of the plurality of backend nodes to execute a first task of the plurality of tasks;

requesting a second backend node from the assigned quantity of the plurality of backend nodes to execute a second task from the plurality of tasks;

receiving, from the first backend node, a first confirmation that the first task has been executed, the execution of the first task providing a first result, the first confirmation indicating that the first result is ready to be committed by the DQP;

receiving, from the second backend node, a second confirmation that the second task has been executed, the execution of the second task providing a second result, the second confirmation indicating that the second result is ready to be committed by the DQP;

executing a conflict check between the first result and the second result; and based on determining the first result does not conflict with the second result, committing the distributed transaction.

11. The system of claim 10, wherein the distributed transaction comprises the first result and the second result.

12. The system of claim 11, further comprising cloud storage, and wherein each of the first result and the second result comprises one of the following: new data in a table in the cloud storage, an update to existing data in the table, a removal of the data from the table, a removal of the table, or a new table in the cloud storage.

13. The system of claim 12, wherein each of the first task and the second task comprises: reading data from storage based on a level of isolation identified by the DQP, and based on the data, executing the first task and the second task.

14. The system of claim 12, wherein the DQP is further configured to, prior to committing the distributed transaction, updating a writable manifest file in a database with references to the first result and the second result.

15. The system of claim 14, wherein committing the distributed transaction comprises:

causing the writable manifest file to be immutable in the database; and writing a name of the immutable manifest file into a table of committed manifest files in the database.

16. A computer storage medium having computer-executable instructions that, when executed by a distributed query processor (DQP) implemented on a processor, cause the processor to perform the following operations:

receiving a distributed execution statement, the distributed execution statement including a plurality of tasks for executing a distributed transaction;

assigning a quantity of backend nodes for executing the plurality of tasks;

requesting a first backend node to execute a first task of the plurality of tasks;

requesting a second backend node to execute a second task from the plurality of tasks;

receiving, from the first backend node, a first confirmation that the first task has been executed, the execution of the first task providing a first result, the first confirmation indicating that the first result is ready to be committed by the DQP;

receiving, from the second backend node, a second confirmation that the second task has been executed, the execution of the second task providing a second result, the second confirmation indicating that the second result is ready to be committed by the DQP;

executing a conflict check between the first result and the second result; and based on determining the first result does not conflict with the second result, committing, by the DQP, the distributed transaction.

17. The computer storage medium according to claim 16, wherein the distributed transaction comprises the first result and the second result.

18. The computer storage medium according to claim 16, wherein each of the first result and the second result comprises one of the following: new data in a table in a database in cloud storage, an update to existing data in the table, a removal of data from the table, a removal of the table, or a new table in the database in the cloud storage.

19. The computer storage medium according to claim 18, wherein the execution of the second task is not initiated until the first confirmation is received.

20. The computer storage medium according to claim 18, wherein the operations further comprise: prior to committing the distributed transaction, updating a writable manifest file in storage with references to the first result and the second result.

* * * * *